US009002369B2

(12) United States Patent
Itoh et al.

(10) Patent No.: US 9,002,369 B2
(45) Date of Patent: Apr. 7, 2015

(54) MANAGEMENT DEVICE, MANAGEMENT METHOD, COMMUNICATION DEVICE, COMMUNICATION METHOD, RELAY DEVICE, RELAY METHOD, PROGRAM, AND COMMUNICATION SYSTEM

(75) Inventors: Daisuke Itoh, Kanagawa (JP); Naoki Miyabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 494 days.

(21) Appl. No.: 13/420,909

(22) Filed: Mar. 15, 2012

(65) Prior Publication Data
US 2012/0252354 A1    Oct. 4, 2012

(30) Foreign Application Priority Data

Mar. 29, 2011    (JP) ................. 2011-073045

(51) Int. Cl.
*H04W 24/00* (2009.01)
*G08G 1/00* (2006.01)
*H04W 48/16* (2009.01)
*H04W 88/04* (2009.01)
*H04W 88/18* (2009.01)

(52) U.S. Cl.
CPC .............. *H04W 48/16* (2013.01); *H04W 88/04* (2013.01); *H04W 88/18* (2013.01)

(58) Field of Classification Search
CPC .............................. H04W 8/12; H04W 76/025
USPC .......... 455/7, 11.1, 422.1, 446, 447, 456.1, 9, 455/515, 524, 525, 67.11, 456.2, 456.3
See application file for complete search history.

(56) References Cited

U.S. PATENT DOCUMENTS 7,720,021 B1    5/2010 Zhou et al.
2005/0239443 A1* 10/2005 Watanabe et al. .......... 455/414.1
(Continued)

FOREIGN PATENT DOCUMENTS

EP    1720288 A1    11/2006
GB    2436187 A    9/2007
(Continued)

OTHER PUBLICATIONS

Partial European Search Report from EP Application No. 12159391, dated Aug. 8, 2012.
(Continued)

*Primary Examiner* — John J Lee
(74) *Attorney, Agent, or Firm* — Sony Corporation

(57) ABSTRACT

A management device includes a management table generation section that generates a management table in which location information showing the present location of a relay device is held in each relay device that relays the connection to a first network, a first receiving section that receives a location information showing the present location of a communication device from the communication device via a second network different from the first network, the communication device being connected to the first network via a relay device, a list generation section that generates a candidate list showing relay device candidates that relay a connection to the first network by communicating with the communication device with reference to the management table based on the location information of the communication device, and a transmission section that transmits the candidate list to the communication device via a second network.

13 Claims, 15 Drawing Sheets

(56) References Cited

U.S. PATENT DOCUMENTS

2009/0003261 A1* 1/2009 Kim .............................. 370/315
2013/0303079 A1* 11/2013 Rofougaran ...................... 455/7

FOREIGN PATENT DOCUMENTS

| JP | 2006-067103 A | 3/2006 |
| WO | 2010006650 A1 | 1/2010 |

OTHER PUBLICATIONS

European Search Report EP Application No. 12159391, dated Nov. 28, 2012.

* cited by examiner

FIG. 2

| DEVICE ID | YES OR NO OF RELAY | TOTAL SERVICE TIME OF RELAY | ACCESS SITUATION | PROTOCOL | LOCATION | WAVE STRENGTH | COMMUNICATION SPEED | ONE TIME PIN |
|---|---|---|---|---|---|---|---|---|
| AP25₁ | YES | 2 : 30 : 56 | NO | 11n | aaa : bbb | xxx | 32Mbps | Abcdefg |
| AP25₂ | YES | 10 : 20 : 05 | DURING CONNECTION TO STAx | 11g | ccc : ddd | yyy | 2Mbps | xyz |
|  |  |  | DURING CONNECTION TO STAy |  |  |  |  |  |
| AP25₃ | YES | 3 : 30 : 02 | NO | 11n | eee : fff | zzz | 64Mbps | hijk |
| ... |  |  |  |  |  |  |  |  |

| DEVICE ID | PRIORITY |
|---|---|
| $AP25_1$ | 2 |
| $AP25_2$ | 3 |
| $AP25_3$ | 1 |

| DEVICE ID | PRIORITY |
|---|---|
| $AP25_1$ | 2 |
| $AP25_2$ | 3 |

| DEVICE ID | PRIORITY AP LIST | SURROUNDING AP LIST | COMMUNICATION SITUATION |
|---|---|---|---|
| AP121 | × | ○ | ▃▅▇ |
| AP122 | × | ○ | ▃▅ |
| AP123 | ○ | × | ▃ |
| AP124 | ○ | ○ | ▃▅▇ |

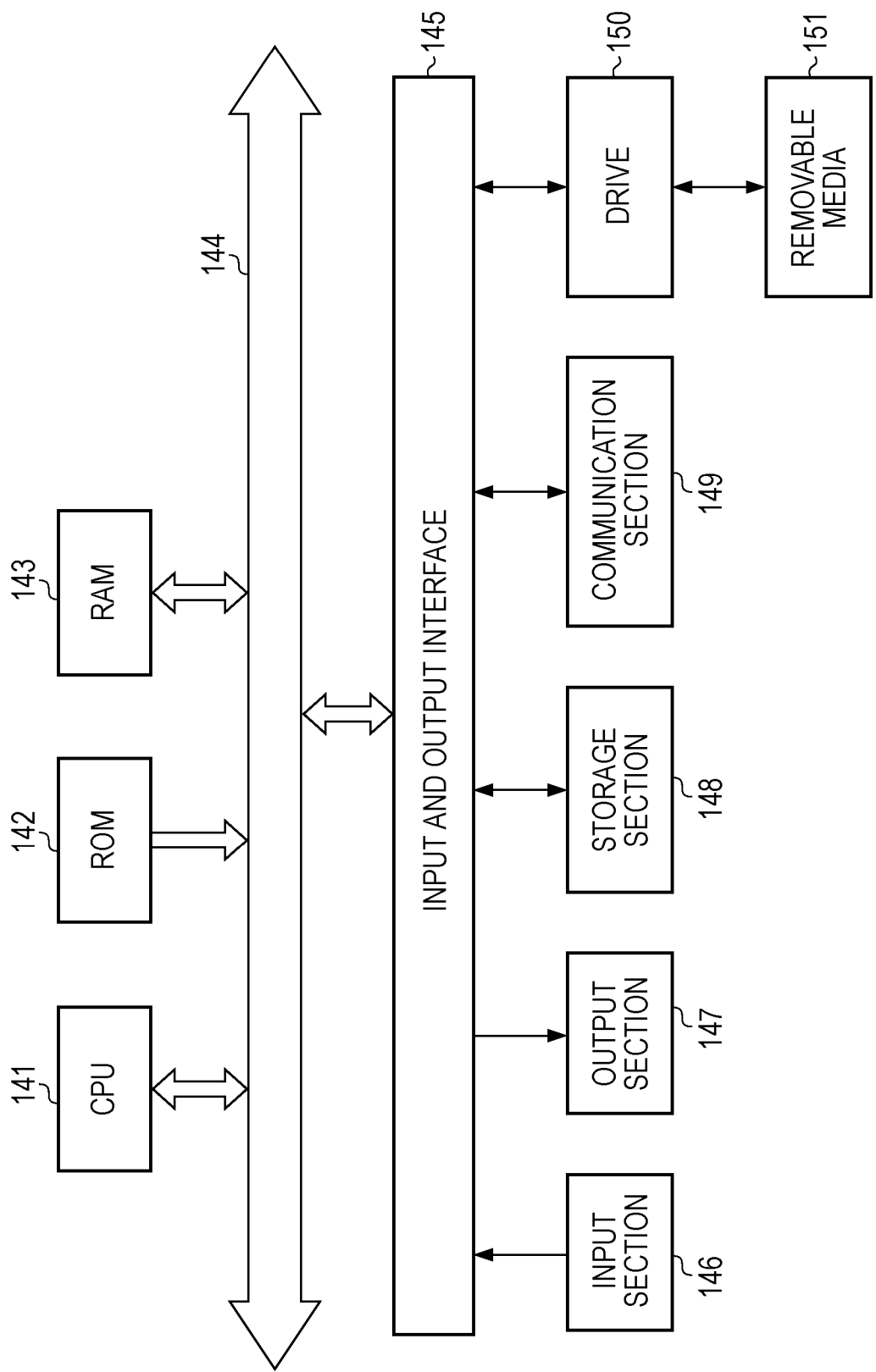

MANAGEMENT DEVICE, MANAGEMENT METHOD, COMMUNICATION DEVICE, COMMUNICATION METHOD, RELAY DEVICE, RELAY METHOD, PROGRAM, AND COMMUNICATION SYSTEM

CROSS-REFERENCE TO RELATED APPLICATION

The present application claims priority from Japanese Patent Application No. JP 2011-073045, filed in the Japanese Patent Office on Mar. 29, 2011, the entire content of which is incorporated herein by reference.

BACKGROUND

The present disclosure relates to a management device, a management method, a communication device, a communication method, a relay device, a relay method, a program and a communication system, and specifically, to a management device, a management method, a communication device, a communication method, a relay device, a relay method, a program and a communication system suitable, for example, to use in cases of connecting to network.

For example, a communication technique is present, in which a management server manages communication situations of congestion or the like generated respectively at a relay device relaying connection to a network and a communication device communicates to a network such as the Internet via a relay device that is assigned by a management server (for example, Japanese Unexamined Patent Application Publication No. 2006-67103).

According to the communication technique, for example, the relay device having the lowest congestion is assigned as the optimal relay device by the management server. Thus, the communication device communicates with the network via a relay device that is set by the management server.

SUMMARY

However, a management server receives the communication situation of a relay device collected by a communication device from the communication device and manages the communication situation.

On this account, according to the timing at which communication situation of the relay device is transmitted, a communication situation that is ascertained by the management server from the communication device and the communication situation in practice may be different from each other. In this case, the communication device may not necessarily communicate with the network via optimal relay device.

The present disclosure is achieved in view of the above described situation and a communication device may be connected to a network via an optimal relay device.

According to an embodiment of the present disclosure, there is provided a management device including: a management table generation section that generates a management table in which location information showing the present location of a relay device is held in each relay device that relays the connection to a first network, a first receiving section that receives a location information showing the present location of a communication device from the communication device via a second network different from the first network, the communication device being connected to the first network via a relay device, a list generation section that with reference to the management table, based on the location information of the communication device, generates a candidate list showing relay device candidates that relay a connection to the first network by communicating with the communication device, and a transmission section that transmits the candidate list to the communication device via a second network.

According to the embodiment of the present disclosure, a request section that requests the location information of the communication device to the communication device via a second network according to a change in communication situation of the relay device communicating with the communication device may be further included, wherein the list generation section may newly generate the candidate list with reference to the management table based on the location information of the communication device that is received according to the request from the receiving section.

According to the embodiment of the present disclosure, the management table generation section may generate the management table in which the communication information indicating the communication situation of the relay device in addition to the location information is held in each relay device, wherein the list generation section may communicate with the communication device and generates the candidate list in which the priority order is associated with the relay device candidates that relay a connection to the first network based on the communication information.

According to the embodiment of the present disclosure, the request section may request the location information of the communication device to the communication device via a second network in response to one of wave strength or communication speed of the relay device communicating with the communication device is less than a predetermined threshold.

According to the embodiment of the present disclosure, a second receiving section that receives the location information and the communication information from the relay device via the second network may be further included, wherein the management table generation section may generate the management table based on the received location information and the communication information.

According to another embodiment of the present disclosure, there is provided a management method of a management device managing a relay device that relays the connection to a first network, the management method including: according to the management device, generating a management table in which location information showing the present location of the relay device is held in each relay device that relays the connection to the first network, receiving a location information showing the present location of a communication device from the communication device via a second network different from the first network, the communication device being connected to the first network via a relay device, generating a candidate list showing relay device candidates that relay a connection to the first network by communicating with the communication device with reference to the management table based on the location information of the communication device, and transmitting the candidate list to the communication device via a second network.

According to still another embodiment of the present disclosure, there is provided a program enabling a computer to function as, a management table generation section that generates a management table in which location information showing the present location of a relay device is held in each relay device that relays the connection to a first network, a first receiving control section that receives a location information showing the present location of a communication device from the communication device via a second network different from the first network, the communication device being connected to the first network via a relay device, a list generation section that communicates with the communication device with reference to the management table based on the location information of the communication device and generates a candidate list showing relay device candidates that relay a connection to the first network, and a transmission control section that transmits the candidate list to the communication device via a second network.

According to the embodiment of the disclosure, a management table generation section, the management table in which location information showing the present location of a relay device is held in each relay device that relays the connection to a first network is generated, the location information showing the present location of a communication device from the communication device via a second network different from the first network is received, the first network is connected to the communication device via a relay device, the communication device communicates with the list generation section with reference to the management table based on the location information of the communication device and generates a candidate list showing relay device candidates that relay a connection to the first network, and the candidate list is transmitted to the communication device via a second network.

According to still another embodiment of the present disclosure, there is provided a communication device including: a communication section that connects to and communicates with a first network, a receiving section that receives a candidate list showing candidates of relay devices that relay a connection to the first network by communicating with the communication section via a second network different from the first network, a list generation section that generates a communicable list showing the relay device that may communicate with the communication section, a connection destination list generation section that generates a connection destination list showing the relay device that may communicate with the communication section of the relay device candidates based on the candidate list and the communicable list, and a determination section that determines the relay device communicated with the communication section based on the connection destination list.

According to the embodiment of the present disclosure, the receiving section may receive the candidate list showing the relay device candidates in which a priority order for communicating with the communication section is associated, and wherein the connection destination list generation section may generate the connection destination list showing the relay device in which the priority order is associated based on the candidate list and the communicable list.

According to the embodiment of the present disclosure, an acquisition section that acquires the location information showing the present location, and a request section that transmits a request signal including the location information and requesting the candidate list via a second network may be further included, wherein the receiving section may receive the candidate list that is transmitted via a second network according to the transmission of the request signal.

According to the embodiment of the present disclosure, the request section may further transmit the request signal including the location information via the second network in response to the request of the location information of the communication device by change in the communication situation of the relay device communicating with the communication section.

According to an embodiment of the present disclosure, there is provided a communication method of a communication device having a communication section that connects to and communicates with a first network, the communication method including: according to the communication device, receiving a candidate list showing candidates of relay devices that relay a connection to the first network by communicating with the communication section via a second network different from the first network, generating a communicable list showing the relay device that may communicate with the communication section, generating a connection destination list showing the relay device that may communicate with the communication section of the relay device candidates based on the candidate list and the communicable list, and determining the relay device communicated with the communication section based on the connection destination list.

According to the embodiment of the present disclosure, there is provided a program enabling a computer of a communication device having a communication section that connects to and communicates with a first network to function as, a receiving control section that communicates with the communication section and receives a candidate list showing candidates of relay devices that relay a connection to the first network via a second network different from the first network, a list generation section that generates a communicable list showing the relay device that may communicate with the communication section, a connection destination list generation section that generates a connection destination list showing the relay device that may communicate with the communication section of the relay device candidates based on the candidate list and the communicable list, and a determination section that determines the relay device communicated with the communication section based on the connection destination list.

According to the embodiment of the disclosure, the candidate list showing candidates of relay devices that relay a connection to the first network communicates with the communication section and is received via a second network different from the first network, the communicable list showing the relay device that may communicate with the communication section is generated, the connection destination list showing the relay device that may communicate with the communication section of the relay device candidates based on the candidate list and the communicable list is generated, and the relay device communicated with the communication section based on the connection destination list is determined.

According to still another embodiment of the present disclosure, there is provided a relay device including: a relay section that relays the connection to a first network, an acquisition section that acquires location information showing the present location, a transmission section that transmits relay information including at least the location information to management device managing the relay device via a second network different from the first network, and a setting section that sets operation of the relay section according to operation of a user.

According to the embodiment of the present disclosure, the setting section may set at least one of relay time in which relaying is possible by the relay section, relay availability, maximum possible relay time, possible relay time band, communication band that is used when relaying, protocol that is used when relaying, or communication device that limits the relay according to operation by the user.

According to the embodiment of the present disclosure, a collection section that collects the communication information showing the communication situation by the relay section may be further included, wherein the transmission section may transmit the relay information also including the communication information to the management device via a second network.

According to still another embodiment of the present disclosure, there is provided a relay method of a relay device having relay section that relays the connection to a first network, the method including: acquiring location information showing the present location, transmitting relay information including at least the location information to management device managing the relay device via a second network different from the first network, and setting operation of the relay section according to operation of a user.

According to still another embodiment of the present disclosure, there is provided a program enabling a computer of a relay device having a relay section that relays the connection to a first network to function as, an acquisition section that acquires location information showing the present location, a transmission section that transmits relay information including at least the location information to management device managing the relay device via a second network different from the first network, and a setting section that sets operation of the relay section according to operation of a user.

According to the embodiment of the disclosure, the connection to the first network is relayed, the location information showing the present location is acquired, the relay information including at least the location information to management device managing the relay device is transmitted via a second network different from the first network, and the operation of the relay section that relays the connection to the first network is set according to operation of a user.

According to still another embodiment of the present disclosure, there is provided a communication system including: a communication device that connects to and communicates with a first network, a relay device that relays the connection of the communication device to the first network and a management device that manages the relay device, the management device having: a generation section that generates a management table in which location information showing the present location of a relay device is held in each relay device that relays the connection to a first network, a first receiving section that receives a location information showing the present location of a communication device from the communication device via a second network different from the first network, the communication device being connected to the first network via a relay device, a first list generation section that generates a candidate list showing relay device candidates that relay a connection to the first network by communicating with the communication device with reference to the management table based on the location information of the communication device, and a first transmission section that transmits the candidate list to the communication device via a second network, the communication device having: a communication section that connects to and communicates with the first network, a second receiving section that receives the candidate list from the first transmission section via a second network, a second list generation section that generates a communicable list showing the relay device that may communicate with the communication section, a connection destination list generation section that generates a connection destination list showing the relay device that may communicate with the communication section of the relay device candidates based on the candidate list and the communicable list, and a determination section that determines the relay device communicated with the communication section based on the connection destination list, and the relay device having: a relay section that relays the connection to the first network, an acquisition section that acquires the location information showing the present location, a second transmission section that transmits the relay information including at least the location information to the management device via a second network, and the setting section that sets operation of the relay section according to operation of the user.

According to the embodiment of the disclosure, with the management device, the management table is generated, in which location information showing the present location of a relay device is held in each relay device that relays the connection to a first network, the location information showing the present location of a communication device is received from the communication device via a second network different from the first network, the communication device being connected to the first network via a relay device, the candidate list showing relay device candidates that relay a connection to the first network communicates with the communication device with reference to the management table based on the location information of the communication device and is generated, and the candidate list is transmitted to the communication device via a second network. With the communication device, the candidate list transmitted from the management device via a second network is received, the communicable list present the relay device that may be communicated with the communication section that connects to and communicates with the first network is generated, the connection destination list showing the relay device that may communicate with the communication section of the relay device candidates is generated based on the candidate list and the communicable list, and the relay device communicated with the communication section is determined based on the connection destination list. With the relay device, the location information showing the present location is acquired, the relay information including at least the location information is transmitted to the management device via a second network, and the operation of the relay section that relays the connection to the first network is set according to operation of the user.

According to the disclosure, the communication device may connect to the network via the optimal relay device.

BRIEF DESCRIPTION OF THE DRAWINGS

FIG. 2 is a view illustrating an example of a management table.

FIG. 6 is a view illustrating an example of a priority AP list.

FIG. 7 is a view illustrating an example of a connection destination AP list.

FIG. 17 is a block diagram illustrating a configuration example of a computer.

DETAILED DESCRIPTION OF EMBODIMENTS

Hereinafter, an embodiment (referred to as the embodiment, below) of the disclosure will be described.

In addition, the description will be carried out in the following order.

1. Embodiment (an example of a case where a connection destination AP list for determining a connection destination relay device is generated based on a priority AP list from a management device and a surrounding AP list generated by a communication device)

2. Modified Example

1. Embodiment

Configuration Example of Communication System 1

Figure 1:
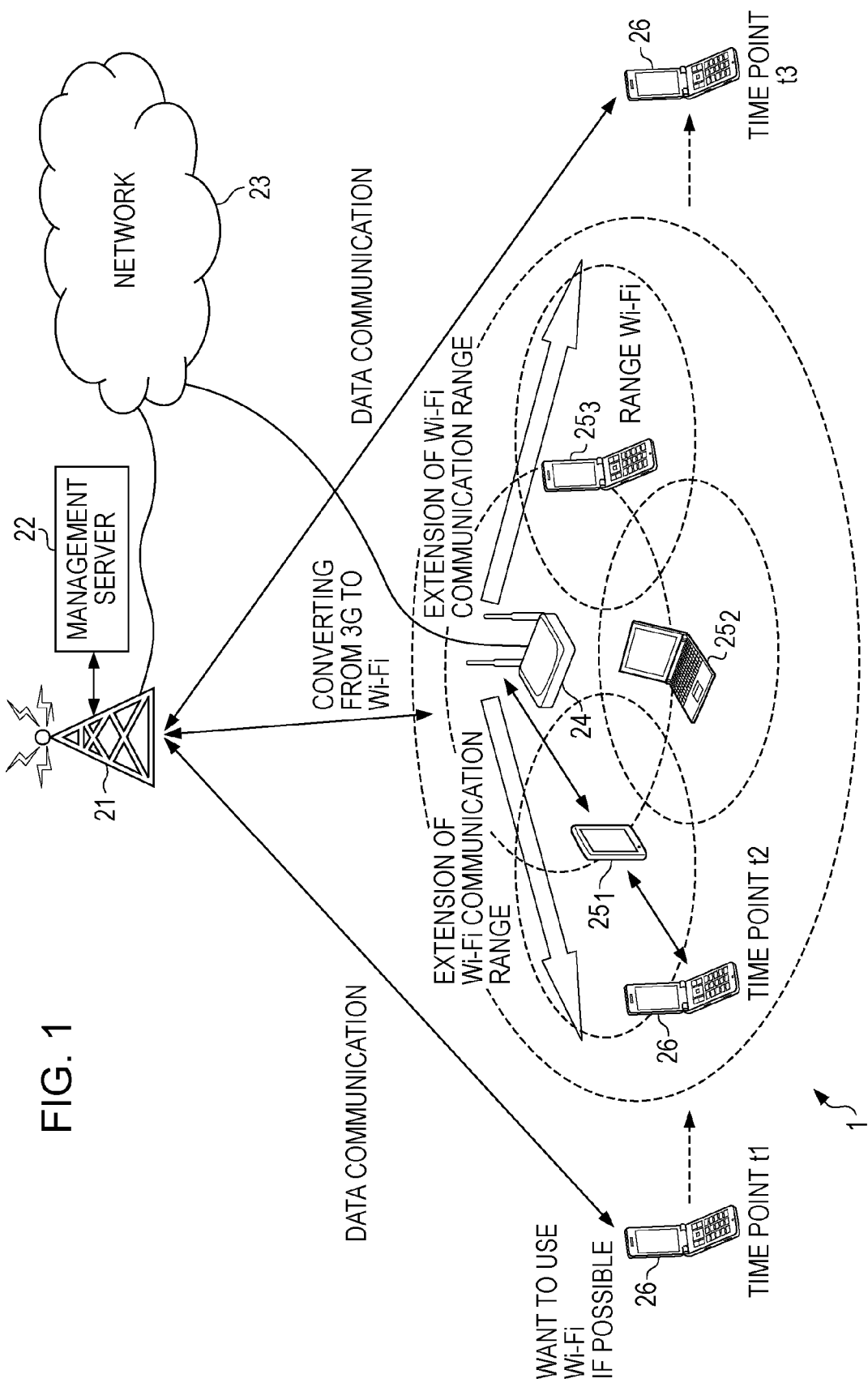
FIG. 1 is a view illustrating a configuration example of a communication system which is an embodiment.

FIG. 1 is a configuration example of the communication system 1 according to an embodiment.

The communication system 1 is configured of a base station 21, a management server 22, a network 23 represented by the Internet or the like, a wireless LAN (Local Area Network) access point 24, relay devices $25_1$ to $25_3$, and a communication device 26. In addition, in a case where it is not necessary to distinguish the relay devices $25_1$ to $25_3$, they are simply referred to as a relay device 25. The number of relay devices $25_1$ to $25_3$ is not limited to three and the number may be N. Furthermore, the number of the wireless LAN access points 24 is also not limited to one and the number may be plurality.

The base station 21 forms a mobile phone network between other base stations in order to relay voice data or the like performed between the communication device 26 represented by a mobile phone and other communication devices (not shown). In addition, for example, the base station 21 relays communication data from the communication device 26 to the network 23.

Here, the base station 21 is mainly used for relaying voice data that is performed between the communication device 26 and other communication devices (not shown) as the mobile phone network. Accordingly, in the base station 21, it is preferred to suppress relay of the communication data to the network 23, such as the Internet or the like, as much as possible so that the communication band for relaying voice data as the mobile phone network put under pressure.

Accordingly, in a case where the communication device 26 is present within a range where Wi-Fi communication may be performed with the relay device 25 for example, in a time point t2 shown in FIG. 1, the communication device 26 performs the Wi-Fi communication with the relay device 25, relays the relay device 25 and then connects to the network 23.

In addition, in a case where the communication device 26 is not present within a range where Wi-Fi communication may be performed with the relay device 25 for example, in the time points t1 and t3 shown in FIG. 1, the communication device 26 relays the base station 21 as the mobile phone network and then connects to the network 23.

Here, in the below description, the communication device 26 is described as performing the Wi-Fi communication with the relay device 25, however, the wireless communication that is performed between the communication device 26 and the relay device 25 is not limited thereto.

The base station 21 receives relay information from the relay device 25 and supplies it to the management server 22.

Here, the relay information is information including a device ID uniquely indicating the relay device 25, a relay availability showing the relay availability to network 23 through Wi-Fi communication, total relay provision time showing the total time connection was relayed to the network 23 using Wi-Fi communication, a protocol (for example, IEEE 802.11a, IEEE 802.11b, IEEE 802.11g, IEEE 802.11n, or the like) that is used in the Wi-Fi communication, location information showing the present location of the relay device 25, wave strength or communication speed in the Wi-Fi communication, an one-time password that is used in authentication performed during Wi-Fi communication or the like.

In addition, the base station 21 for example, receives connection start information or connection finish information from the communication device 26 and supplies it to the management server 22. Here, the connection start information is referred to as information showing that a predetermined relay device 25 starts the Wi-Fi communication with the communication device 26. In addition, the connection finish information is referred to as information showing that a predetermined relay device 25 finishes the Wi-Fi communication.

The management server 22 generates a management table managing a communication state of the relay device 25 based on the relay information supplied from the relay device 25 via the base station 21, the connection start information and the connection finish information that are supplied from the communication device 26 via base station 21. In addition, the management table will be described with reference to FIG. 2.

The wireless LAN access point 24 relays communication data communicated between the relay device 25 and the network 23.

The relay device 25 is for example, connected to the communication device 26 and has a relay function relaying the communication data from the communication device 26 to the wireless LAN access point 24. In addition, the relay device 25 also functions, for example, as a mobile phone or the like, and is used as a mobile phone or the like by the user of the relay device 25.

The relay device 25 may be configured to function as a wireless LAN access point instead of the relay function, or alongside the relay function.

The relay device 25 generates suitable relay information and supplies it to the management server 22 via the base station 21.

The communication device 26 is for example, the mobile phone or the like and is connected to the network 23 via the base station 21 as the mobile phone network. In addition, for example, the communication device 26 performs the Wi-Fi communication with the relay device 25, relays the relay device 25 and connects to the network 23.

According to the start of the Wi-Fi communication with the relay device 25, the communication device 26 generates the connection start information including the device ID of the relay device 25 that is a communication partner of the Wi-Fi communication and transmits it to the base station 21.

In addition, according to the finish of the Wi-Fi communication with the relay device 25, the communication device 26 generates the connection finish information including the device ID of the relay device 25 that is a communication partner of the Wi-Fi communication and transmits it to the base station 21.

Example of Management Table

Next, FIG. 2 illustrates an example of a management table. The management table associates each device ID of the relay device 25 with relay availability showing relay availability through Wi-Fi communication, total relay provision time showing total time that relays the connection to the network 23 through Wi-Fi communication, the connection situation with the communication device 26, protocol that is used in the Wi-Fi communication, the location information showing the present location of the relay device 25, the wave strength or the communication speed in the Wi-Fi communication, the one-time password that is used in the authentication with the relay device 25 performed during Wi-Fi communication.

Here, in FIG. 2, the device IDs "$AP25_1$", "$AP25_2$" and "$AP25_3$" show the device IDs of the relay devices $25_1$, $25_2$ and $25_3$. In addition, in FIG. 2, "STAx" and "STAy" show different communication devices 26 respectively.

Summary of Communication System 1

Next, with reference to FIGS. 3 to 7, summary of the processing performed by the communication system 1 will be described.

Figure 3:
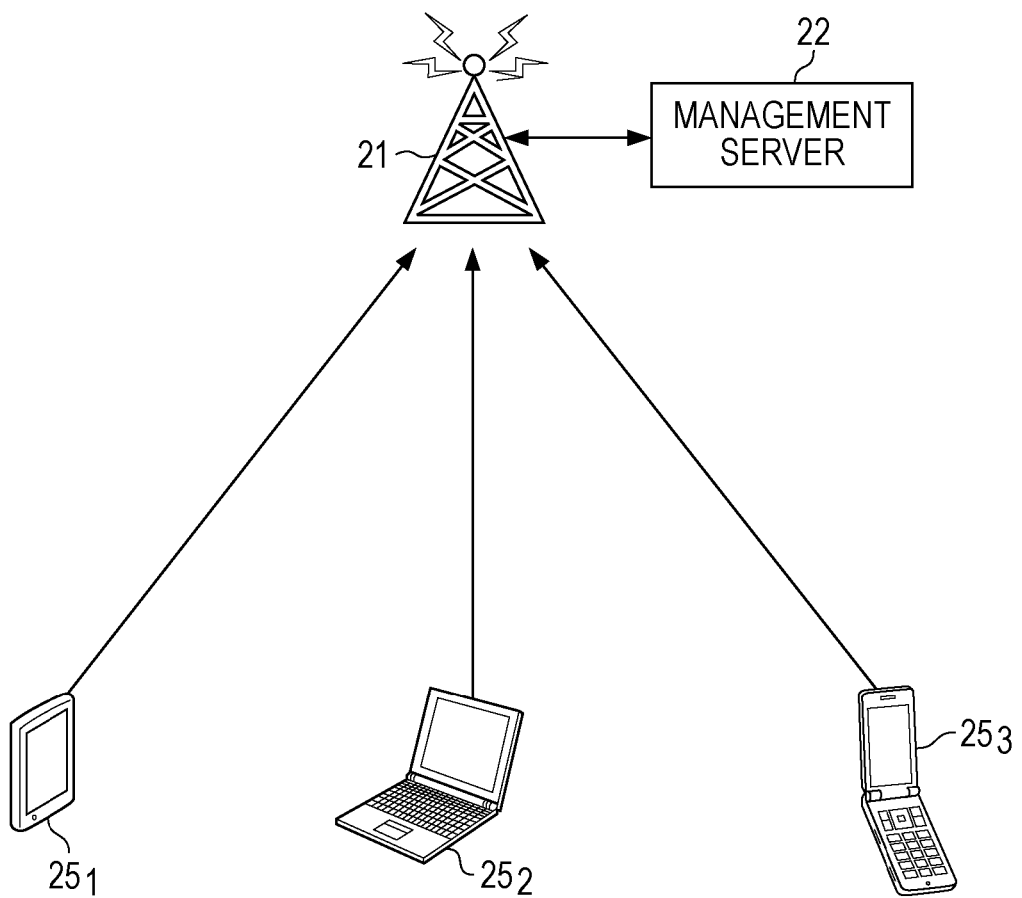
FIG. 3 is a view illustrating an example where a management table is generated.

FIG. 3 illustrates an example where the management server 22 generates the management table.

As shown in FIG. 3, the relay devices $25_1$ to $25_3$ generate suitable relay information of themselves and transmit it to the management server 22 via the base station 21. Accordingly, as shown in FIG. 2, the management server 22 generates the management table based on the relay information supplied from the relay devices $25_1$ to $25_3$ via base station 21.

Figure 4:
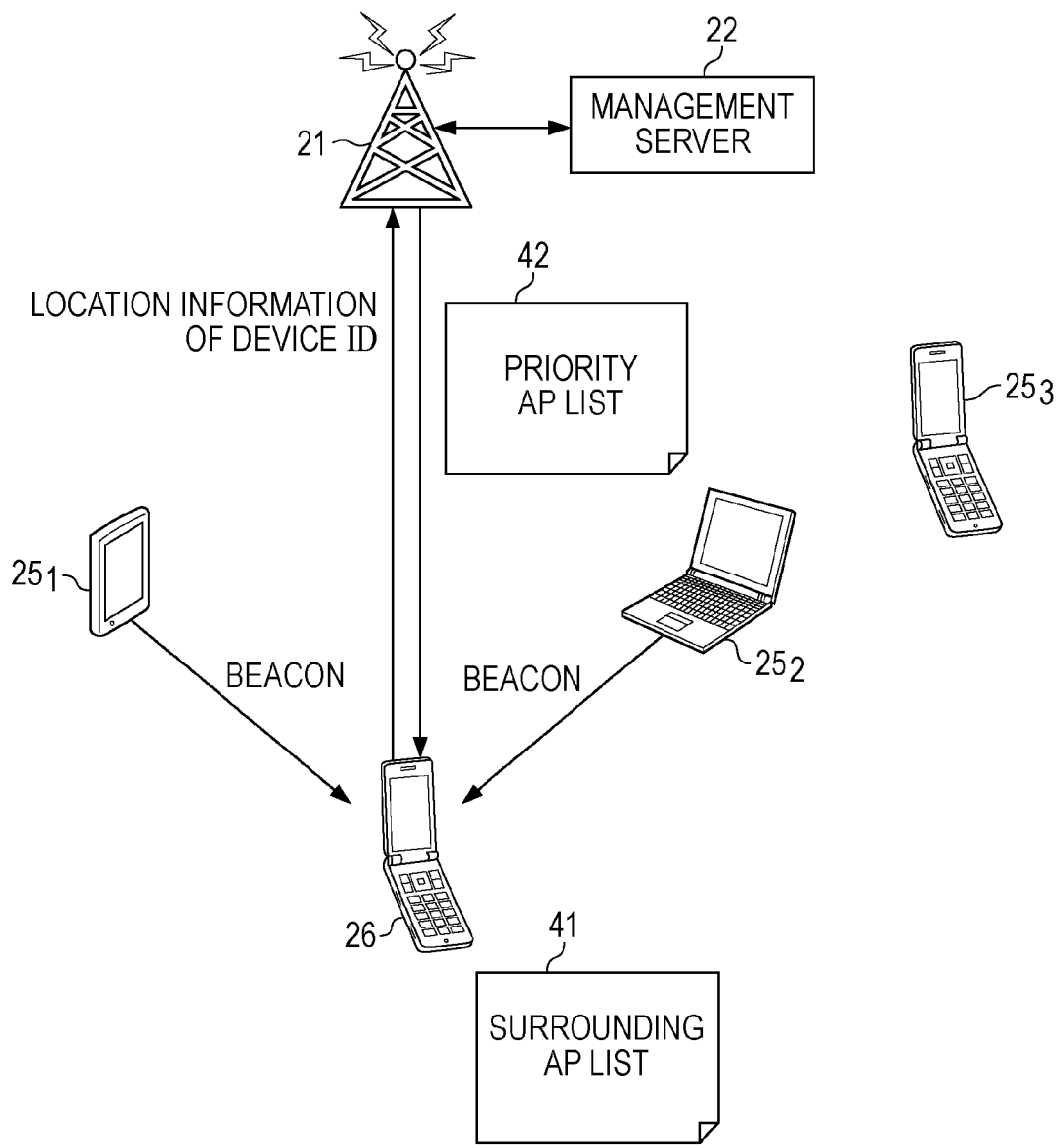
FIG. 4 is a view illustrating an example where a relay device relays and connects to a network.

FIG. 4 illustrates an example in a case where the communication device 26 relays for example, the relay device $25_1$ and then performs connection to the network 23.

The communication device 26 generates a surrounding AP list 41 for the relay device 25 for example, communicable through Wi-Fi communication based on whether or not receiving beacon from the relay devices $25_1$ to $25_3$ present around the communication device 26 when performing connection to the network 23.

Figure 5:
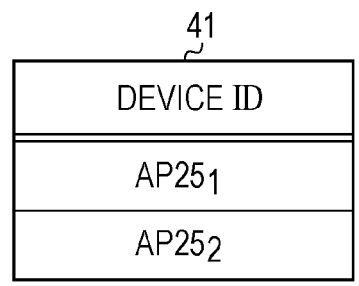
FIG. 5 is a view illustrating an example of a surrounding AP list.

In other words, for example, the communication device 26 receives the beacon from the relay devices $25_1$ to $25_2$, however, in a case where the beacon is not received from the relay device $25_3$, as shown in FIG. 5, the communication device 26 generates the surrounding AP list 41. Here, in FIG. 5, the device ID "$AP25_1$" uniquely indicates relay device $25_1$ and the device ID "$AP25_2$" uniquely indicates relay device $25_2$.

In addition, as shown in FIG. 4, the communication device 26 generates a communication packet including the device ID uniquely indicating communication device 26 and the location information showing the present location of the communication device 26, and transmits it to the management server 22 via the base station 21.

According to the receiving of the communication packet from the communication device 26 via base station 21, the management server 22 generates a priority AP list 42 for the relay devices $25_1$ to $25_3$ present around the present location of the communication device 26 with reference to the management table.

In other words, for example, as illustrated in the management table in FIG. 2, the communication speed of the relay device $25_1$ is 32 Mbps, the communication speed of the relay device $25_2$ is 2 Mbps and the communication speed of the relay device $25_3$ is 64 Mbps.

Accordingly, for example, the management server 22 increases the priority order as the communication speed is fast and then generates the priority AP list 42 as shown in FIG. 6. In the priority AP list 42 in FIG. 6, the priority order 2, the priority order 3 and the priority order 1 are associated with the device ID "$AP25_1$", the device ID "$AP25_2$" and the device ID "$AP25_3$" respectively.

In addition, the management server 22 determines the priority order based on the communication speed and determination method of the priority order is not limited to the embodiment. In other words, for example, the management server 22 may determine the priority order based on articles shown in FIG. 2, "relay availability", "connection situation", "protocol", "wave strength", "communication speed" or the like.

As shown in FIG. 4, the management server 22 transmits the generated priority AP list 42 to the communication device 26 via the base station 21.

The communication device 26 generates a connection destination AP list 43 as shown in FIG. 7 based on the generated surrounding AP list 41 and the priority AP list 42 transmitted from the management server 22 via base station 21.

In other words, for example, the communication device 26 generates the connection destination AP list 43 in which (the device ID, the priority order)={$(AP25_1,2),(AP25_2,3)$} is described corresponding to the device ID={$AP25_1,AP25_2$} described in the surrounding AP list 41 in (the device ID, of the priority order)={$(AP25_1,2),(AP25_2,3),(AP25_3,1)$} described in the priority AP list 42.

Thus, the communication device 26 selects (determines) the connection destination that performs the Wi-Fi communication from a plurality of relay devices $25_1$ to $25_3$ based on the connection destination AP list 43.

In other words, for example, the communication device 26 attempts to start the Wi-Fi communication in order of descending priority order based on the connection destination AP list 43. In this case, the priority order of the relay device $25_1$ corresponding to the device ID "$AP25_1$" is the highest in the connection destination AP list 43 so that the communication device 26 is connected to the relay device $25_1$.

In addition, if the communication device 26 is not connected to the relay device $25_1$, the communication device 26 attempts to start the connection to the relay device $25_2$ that is next highest in the priority order.

Configuration Example of Management Server 22

Figure 8:
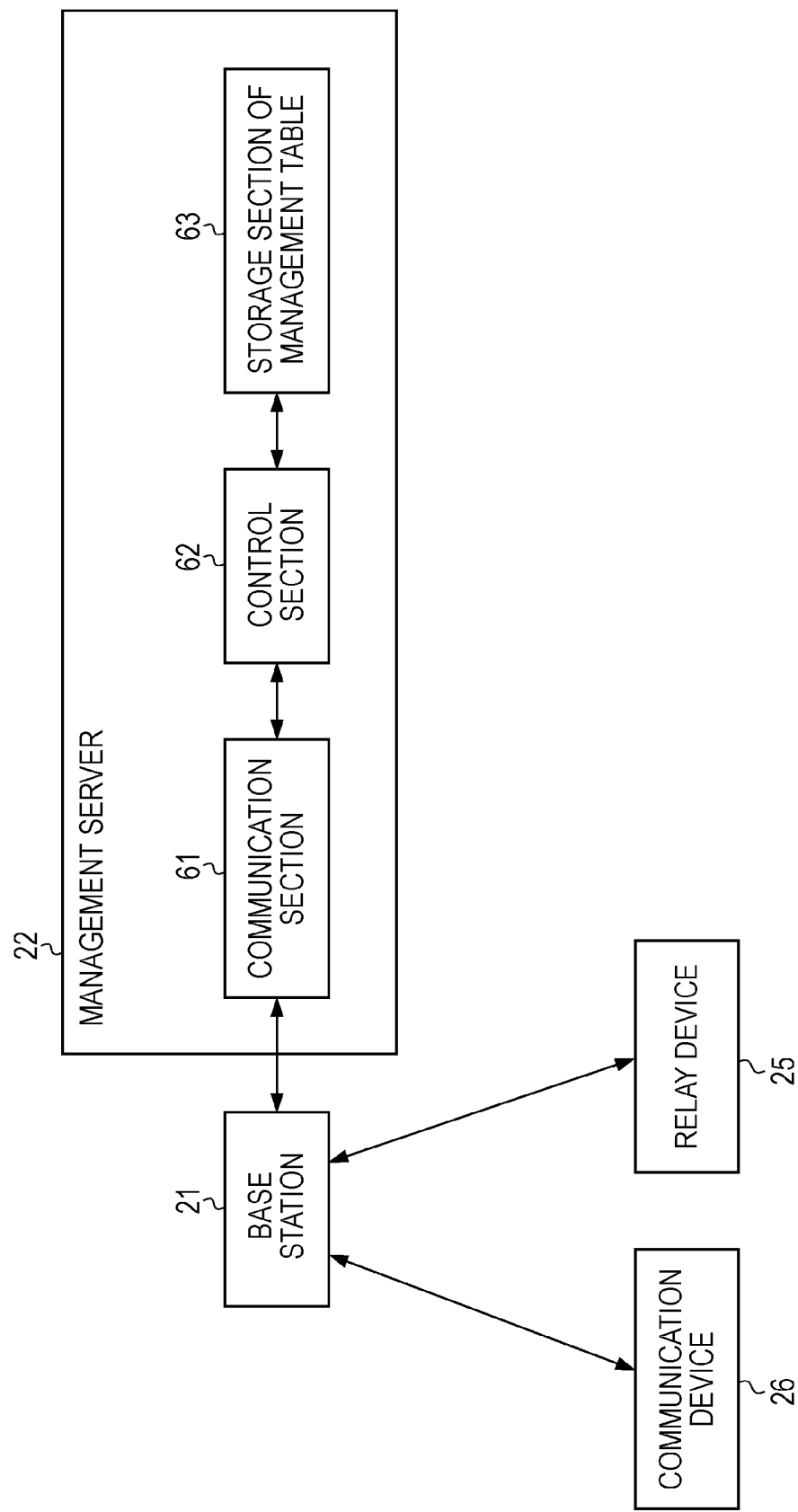
FIG. 8 is a block diagram illustrating a configuration example of a management server.

FIG. 8 illustrates a configuration example of the management server 22.

The management server 22 is configured from a communication section 61, a control section 62 and a management table storage section 63.

The communication section 61 receives the relay information transmitted from the relay device 25 via the base station 21 and supplies it to the control section 62.

In addition, for example, the communication section 61 receives the communication packet including the device ID and the location information of the communication device 26 transmitted from the communication device 26 via the base station 21, and supplies it to the control section 62.

Furthermore, for example, the communication section 61 supplies the priority AP list 42 form the control section 62 to the communication device 26 via the base station 21.

In addition, for example, the communication section 61 supplies a message (a message demanding the communication packet from the communication device 26) prompting reconnection to the communication device 26 through Wi-Fi communication from the control section 62 to the communication device via the base station 21.

The control section 62 updates the management table stored in the management table storage section 63 based on the relay information from the communication section 61.

In other words, for example, the control section 62 reads the management table stored in the management table storage section 63 from the management table storage section 63.

Thus, the control section 62 generates a new management table based on the read management table and the relay information from the communication section 61, supplies it to the management table storage section 63 and then the management table is stored by overwriting.

In addition, for example, the control section 62 generates the priority AP list 42 using the management table stored in the management table storage section 63 based on the communication packet from the communication section 61, and supplies it to the communication section 61.

Furthermore, for example, the control section 62 decides whether or not the communication situation of the relay device 25 during Wi-Fi communication with the communication device 26 is deteriorated based on the management table stored in the management table storage section 63. In addition, in a case where the wave strength of the relay device 25 during Wi-Fi communication with the communication device 26 is below a predetermined first threshold, or in a case where the communication speed of the relay device 25 during Wi-Fi communication with the communication device 26 is below the predetermined first threshold, the communication situation is determined to be deteriorated.

Thus, in a case where the communication situation of the relay device 25 during Wi-Fi communication with the communication device 26 is determined to be deteriorated, the control section 62 generates the message prompting reconnection to the communication device 26 through Wi-Fi communication and supplies it to the communication section 61.

As shown in FIG. 2, the management table storage section 63 stores (holds) the management table.

Description of Operation of Management Server 22

Figure 9:
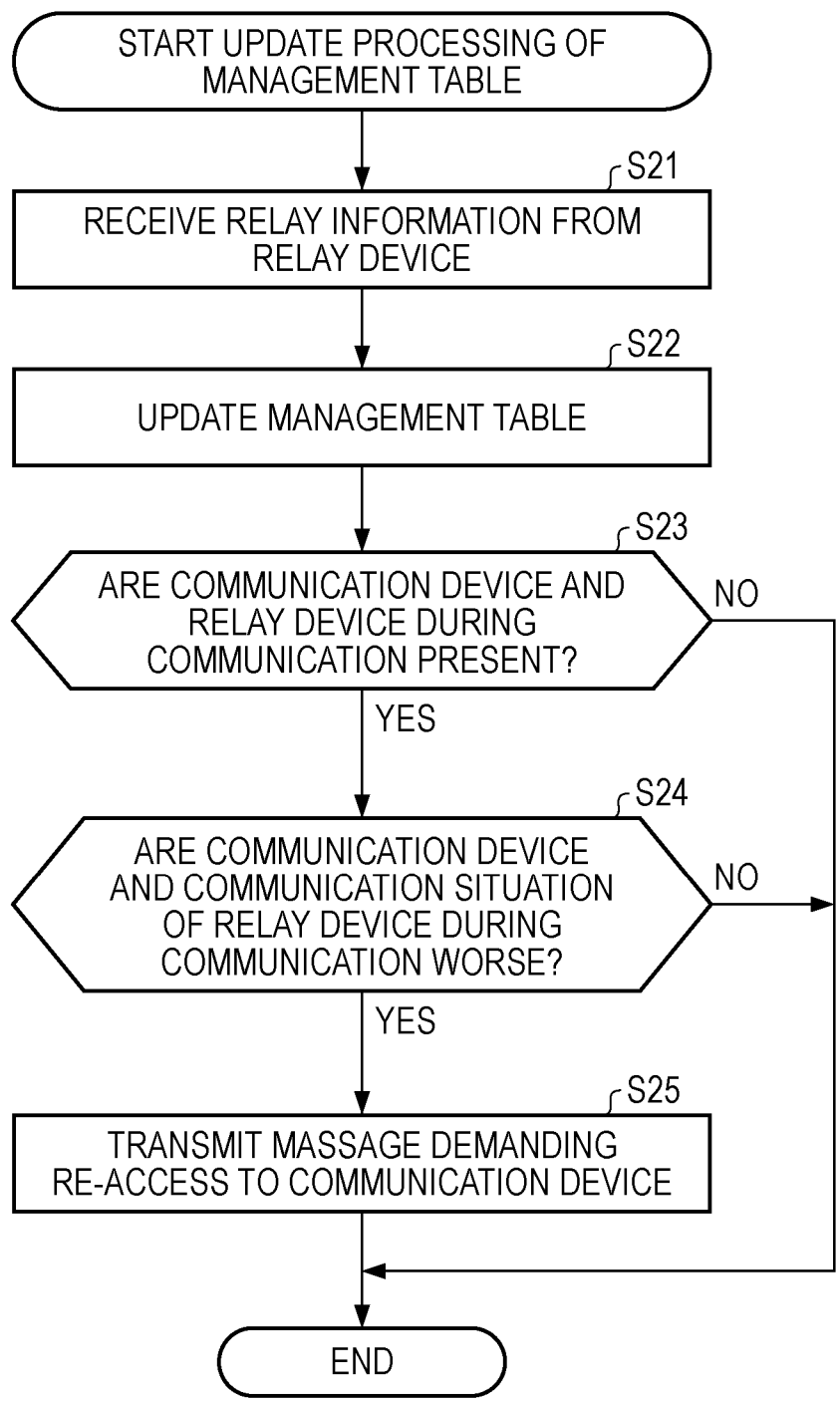
FIG. 9 is a flowchart which explains an update processing of a management table performed by the management server.

Next, the update processing of the management table where the management server 22 updates the management table based on the relay information from the relay device 25 will be described with reference to a flowchart of FIG. 9.

The update processing of the management table starts for example, when the relay information is transmitted from the relay device 25 to the management server 22 via the base station 21.

In step S21, the communication section 61 receives the relay information transmitted from the relay device 25 via the base station 21 and supplies it to the control section 62.

In step S22, the control section 62 updates the management table stored in the management table storage section 63 based on the relay information from the communication section 61. In other words, for example, the control section 62 reads the management table stored in the management table storage section 63 from the management table storage section 63. Thus, the control section 62 generates the updated management table based on the relay information from the communication section 61, supplies it to the management table storage section 63 and then the management table is stored by overwriting.

In step S23, the control section 62 decides whether or not the relay device 25 is present during communication with the communication device 26 based on the management table stored in the management table storage section 63. Thus, in a case where the relay device 25 during communication with the communication device 26 is present, the control section 62 makes the process advance to step S24.

In step S24, the control section 62 decides whether or not the communication situation of the relay device 25 during communication with the communication device 26 is deteriorated based on the management table stored in the management table storage section 63, and if it is deteriorated, the control section 62 makes the process advanced to step S25.

In addition, in a case where the wave strength of the relay device 25 during Wi-Fi communication with the communication device 26 is below the predetermined first threshold, or in a case where the communication speed of the relay device 25 during Wi-Fi communication with the communication device 26 is below the predetermined first threshold, the communication situation is determined to be deteriorated.

In step S25, the control section 62 generates the message prompting reconnection to the communication device 26 through Wi-Fi communication and supplies it to the communication section 61. The communication section 61 transmits the message from the control section 62 to the communication device 26 via the base station 21.

As described above, the update processing of the management table is finished.

In addition, in step S23, in a case where the relay device 25 during communication with the communication device 26 is not present, or in step S24, the communication situation of the relay device 25 during communication with the communication device 26 is not deteriorated, the update processing of the management table is also finished.

As described above, according to the update processing of the management table, suitable management table is updated based on the relay information from the relay device 25 so that the contents of the management table may be the latest status.

Figure 10:
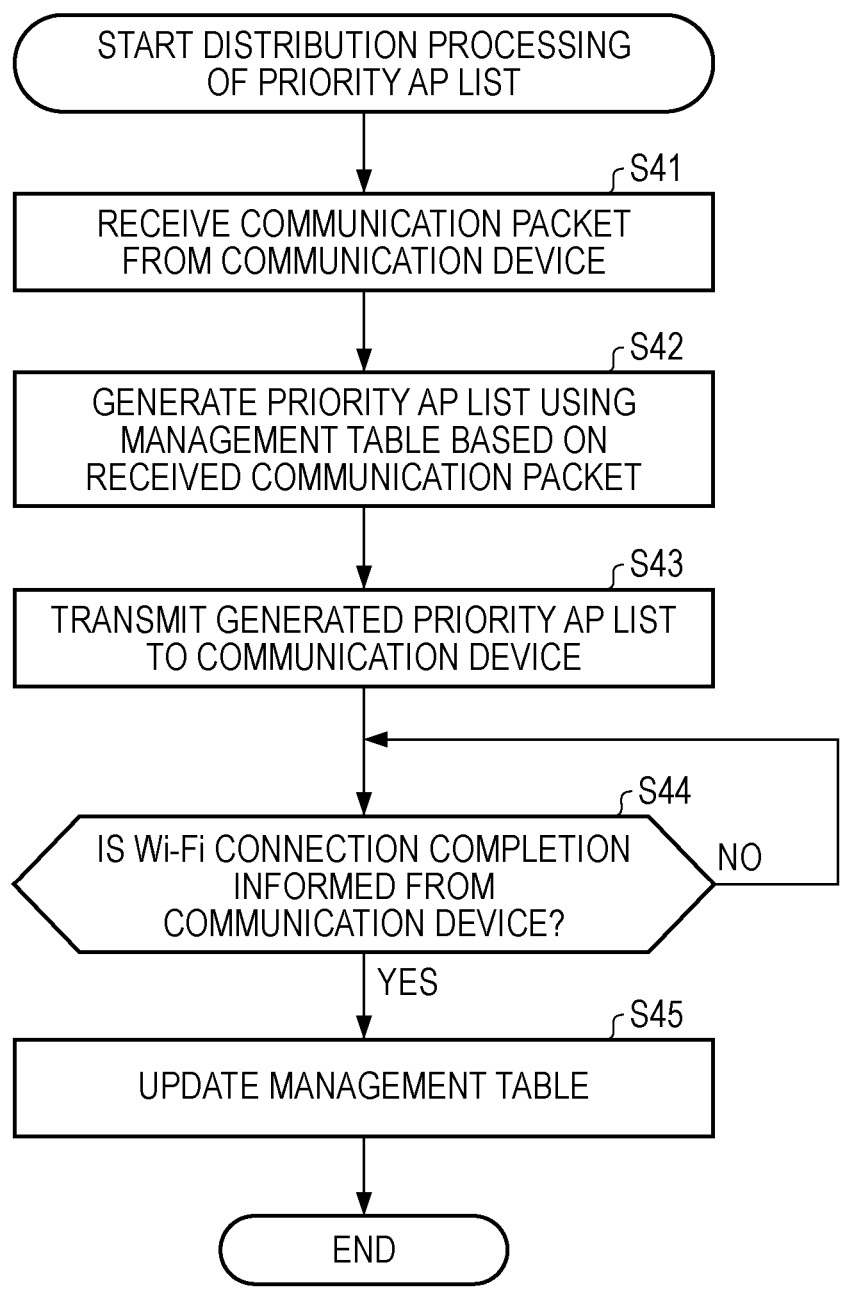
FIG. 10 is a flowchart which explains a distribution processing of a priority AP list performed by a management server.

Next, distribution processing of the priority AP list will be described with reference to a flowchart of FIG. 10, in which the management server 22 distributes the priority AP list 42 according to the communication packet from the communication device 26.

The distribution processing of the priority AP list starts for example, when the communication packet is transmitted from the communication device 26 to the management server 22 via the base station 21.

In step S41, the communication section 61 receives the communication packet transmitted from the communication device 26 via the base station 21 and supplies it to the control section 62.

In step S42, the control section 62 generates the priority AP list 42 using the management table stored in the management table storage section 63 based on the communication packet from the communication section 61, and supplies it to the communication section 61.

In step S43, the communication section 61 supplies the priority AP list 42 from the control section 62 to the communication device 26 via the base station 21.

In step S44, the control section 62 decides whether or not the connection between the communication device 26 and the relay device 25 through Wi-Fi communication is completed, based on whether or not the connection start information is supplied from the communication device 26 via the base station 21 and the communication section 61.

Thus, the control section 62 repeats the process of step S44 until deciding that the connection between the communication device 26 and the relay device 25 through Wi-Fi communication is completed. In a case where the control section 62 decides that the communication device 26 and the relay device 25 are connected through Wi-Fi communication, the control section 62 makes the process advanced to step S45.

In step S45, the control section 62 updates the management table stored in the management table storage section 63 based on the connection start information from the communication section 61. As described above, the distribution processing of the priority AP list is finished.

As described above, according to the distribution processing of the priority AP list, the priority AP list 42 from the management table is generated according to the location information of the communication device 26 and the priority AP list 42 is distributed to the communication device 26.

Thus, the communication device 26 selects the relay device 25 supplying the optimal relay function to the communication device 26 using the priority AP list 42 from the management server 22 and may be connected to the network 23 via the selected relay device 25. Accordingly, the user of the communication device 26 may communicate in comfortable communication environment without feeling any inconvenience such as communication delay in communication with the network 23.

Configuration Example of Relay Device 25

Figure 11:
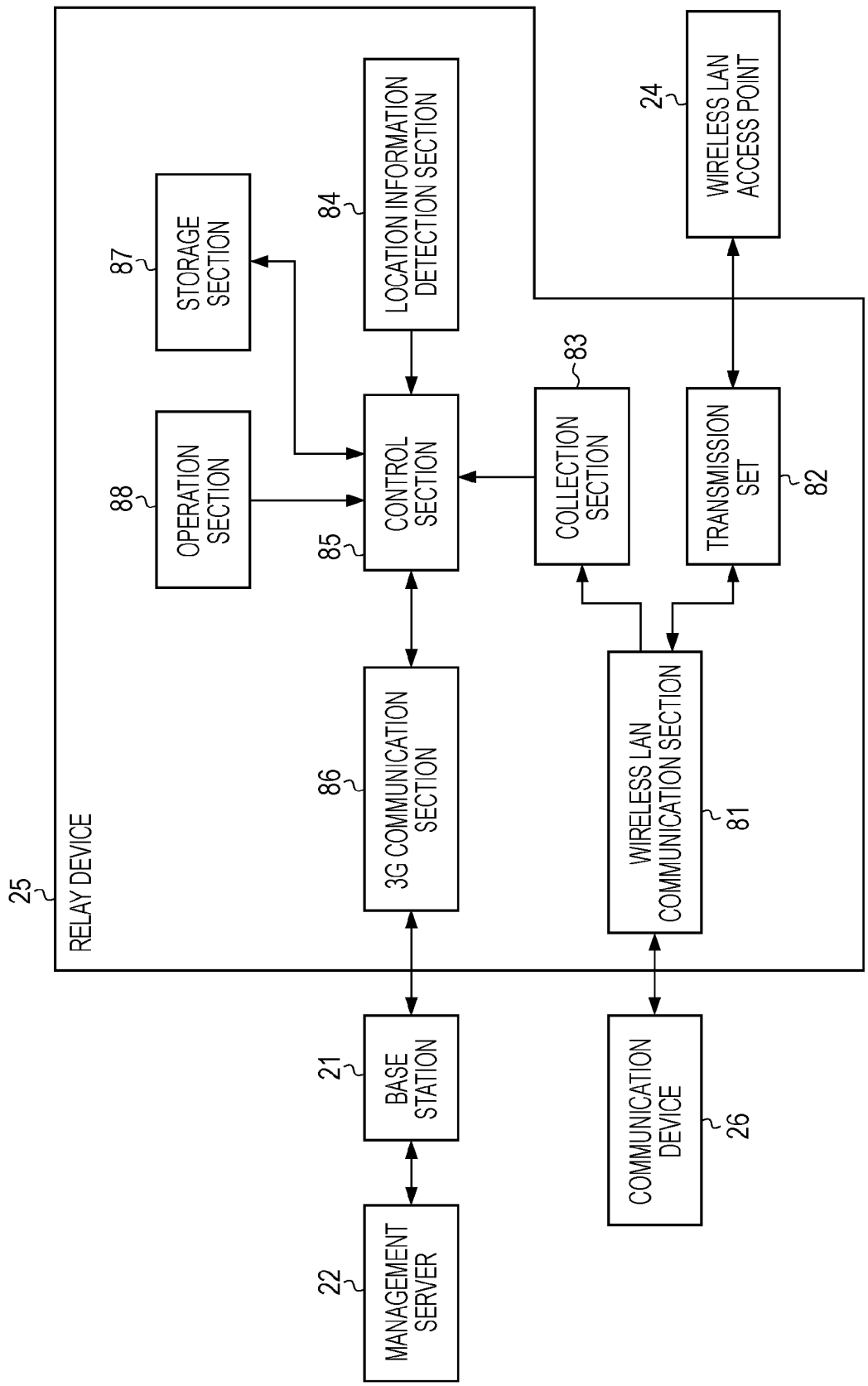
FIG. 11 is a block diagram illustrating a configuration example of a relay device.

Next, FIG. 11 illustrates a configuration example of the relay device 25.

The relay device 25 is configured of a wireless LAN communication section 81, a transmission section 82, a collection section 83, a location information detection section 84, a control section 85, a 3G communication section 86, a storage section 87 and an operation section 88.

The wireless LAN communication section 81 mutually communicates the communication data with the communication device 26 through wireless communication, for example, Wi-Fi communication or the like. In other words, for example, the wireless LAN communication section 81 receives the communication data from the communication device 26 and supplies it to the transmission section 82. In addition, for example, the wireless LAN communication section 81 transmits the communication data from the transmission section 82 to the communication device 26.

The transmission section 82 transmits (relays) the communication data from the wireless LAN communication section to the wireless LAN access point 24. In addition, for example, the transmission section 82 transmits the communication data from the wireless LAN access point 24 to the wireless LAN communication section 81.

The collection section 83 collects the communication situation (data showing the communication situation) of the Wi-Fi communication from the wireless LAN communication section 81 and supplies it to the control section 85.

The location information detection section 84 detects the location information showing the present location of the relay device 25 using a GPS (a Global Positioning System) or the like and supplies it to the control section 85.

In addition, in a case where the relay device 25 is for example, a mobile phone or the like, the location information of the base station thereof from a nearby base station is received in the 3G communication section 86, and the received location information may be supplied to the control section 85 as the location information of the relay device 25. In this case, the location information detection section 84 is not requested to arrange the location information detection section 84 in the relay device 25.

The control section 85 performs control of the wireless LAN communication section 81, the transmission section 82, the collection section 83, the location information detection section 84 and the 3G communication section 86 based on for example, the operation signal from the operation section 88.

In addition, for example, the control section 85 reads the device ID of the relay device 25 from the storage section 87. Thus, the control section 85 generates the relay information based on the device ID of the read relay device 25, the communication situation from the collection section 83, and the location information from the location information detection section 84, and supplies the relay information to the 3G communication section 86.

In addition, the control section 85 generates the relay information including a total relay service time showing a total time of relaying the communication data from the communication device 26 to the network 23 and then supplies it to the management server 22 via 3G communication section 86 and the base station 21.

Accordingly, in the management table as shown in FIG. 2, the management server 22 may comprehend the total reply service time in each relay device 25.

Thus, for example, in the management server 22, in a case where a wide communication band is assigned to the relay device 25 on a priority basis according to the total reply service time of the relay device 25 or the relay device 25 is also used as a mobile phone or the like, mobile phone bills may be discounted. As described above, the communication system 1 makes an environment where the relay device 25 easily supplies the relay function.

The control section 85 functions for example, as so-called mobile phone and communicates voice data or the like with other mobile phones via the 3G communication section 86 and the base station 21. Accordingly, the user of the relay device 25 may perform a telephone call with users of other mobile phones.

The 3G communication section 86 transmits the relay information from the control section 85 to the management server 22 via the base station 21. In addition, for example, the 3G communication section 86 receives the voice data or the like from the base station 21 and supplies it to the control section 85.

The storage section 87 holds beforehand other device ID of the relay device 25 such as a program that is performed by the control section 85.

The operation section 88 is configured of for example, an operation button or the like, and is operated by the user of the relay device 25. The operation section 88 supplies a corresponding operation signal to the control section 85 corresponding to the operation by the user.

However, the relay device 25 also functions as a mobile phone or the like besides having the relay function relaying the connection to the network 23 with the communication device 26.

Figure 12:
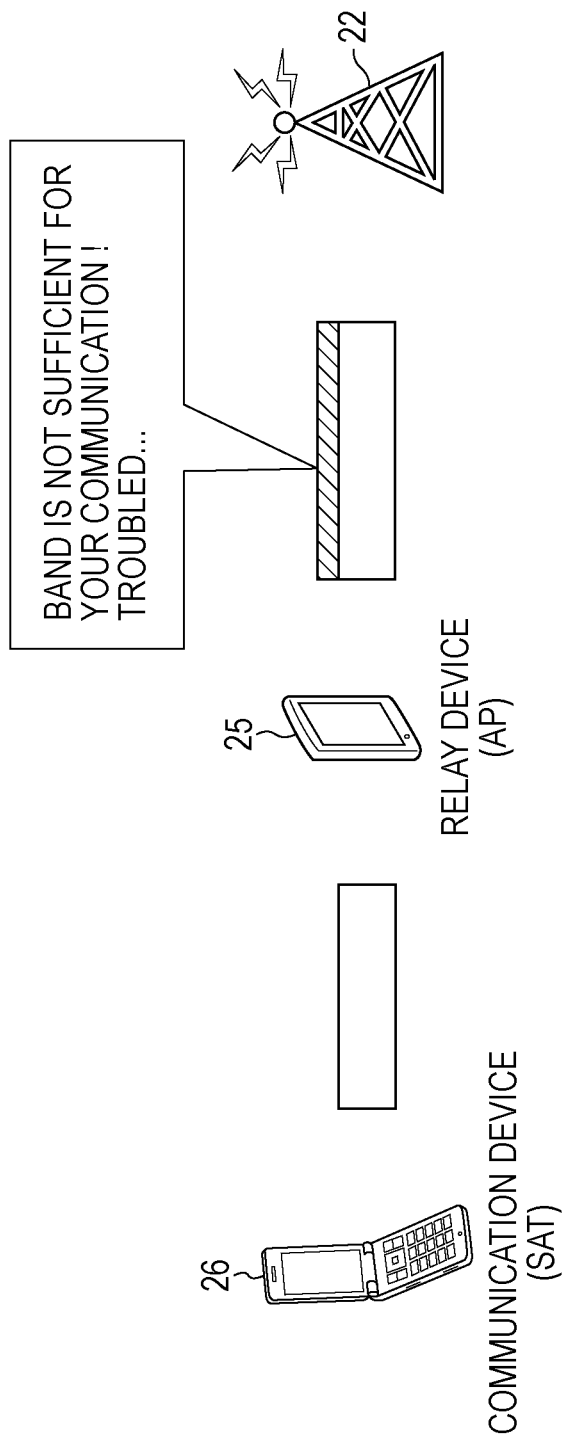
FIG. 12 is a view illustrating an example where a communication band may not be sufficiently secured.

Accordingly, in the relay device 25, in a case where the relay function is opened without limitation, as shown in FIG. 12, the user of the relay device 25 may not secure the communication band demanded to use the relay device 25 as a mobile phone or the like. In addition, in FIG. 12, a white rectangle shows the communication band used in the relay function and a rectangle indicated by hatched lines shows the communication band used in the mobile phone or the like.

Now, it is preferred that the relay device 25 for example, be set at least one of yes or no of providing of the relay function, providing time that may provide the relay function in maximum, a time zone that provides the relay function, the communication band that is used in the relay function, the protocol that is used in Wi-Fi communication, and the communication devices 26 that permits (or prohibits) the providing of the relay function.

Specifically, for example, the operation section 88 supplies the corresponding operation signal to the control section 85 corresponding to performing of the setting operation by the user. The control section 85 generates the setting information showing contents that are set by the setting operation of the user and supplies and stores it in the storage section 87, according to the operation signal from the operation section 88.

Thus, the control section 85 performs control of the wireless LAN communication section 81 and the transmission section 82 in order to relay the communication data from the communication device 26 according to the setting information stored in the storage section 87.

In addition, the setting information is collected by the collection section 83 and is also used when the relay information is generated.

Operation Description of Relay Device 25

Figure 13:
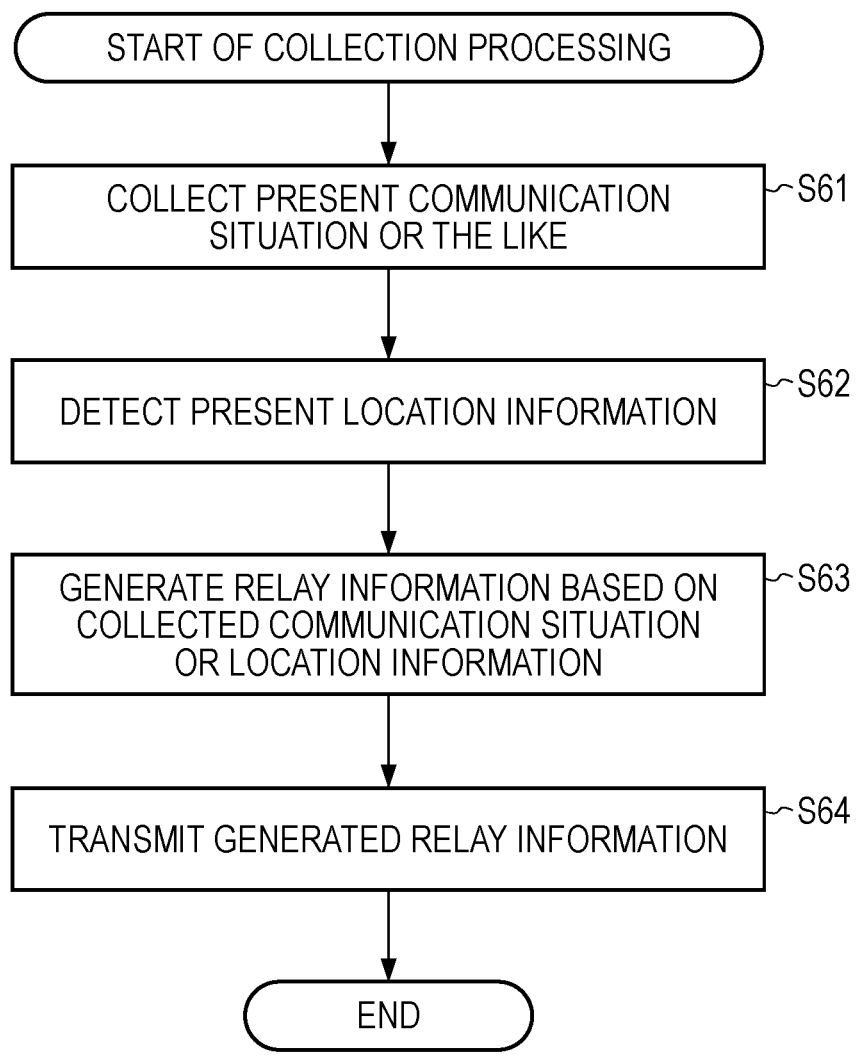
FIG. 13 is a flowchart which explains a collection processing performed by a relay device.

Next, collection processing will be described with reference to a flowchart of FIG. 13, in which the relay device collects the communication situation through Wi-Fi communication and simultaneously transmits the relay information obtained with detecting of the location information to the management server 22 via the base station 21.

The collection processing is started whenever predetermined time has elapsed. In addition, the control section 85 has a time count unit (not shown) and counts the time.

In step S61, the collection section 83 collects the communication situation (data that shows the communication situation) of the Wi-Fi communication from the wireless LAN communication section 81 and supplies it to the control section 85.

In step S62, the location information detection section 84 detects the location information showing the present location of the relay device 25 using the GPS or the like and supplies it to the control section 85.

In step S63, the control section 85 reads the device ID of the relay device 25 from the storage section 87. Thus, the control section 85 generates the relay information based on the device ID of the read relay device 25, the communication situation from the collection section 83 and the location information from the location information detection section 84, and supplies it to the 3G communication section 86.

In step S64, the 3G communication section 86 transmits the relay information from the control section 85 to the management server 22 via the base station 21.

As described above, the collection processing is finished.

As described above, according to the collection processing, suitable relay information is generated and transmits it to the management server 22 so that in the management server 22, the management table managing the communication status of the relay device 25 may be held in the latest status.

Configuration Example of Communication Device 26

Figure 14:
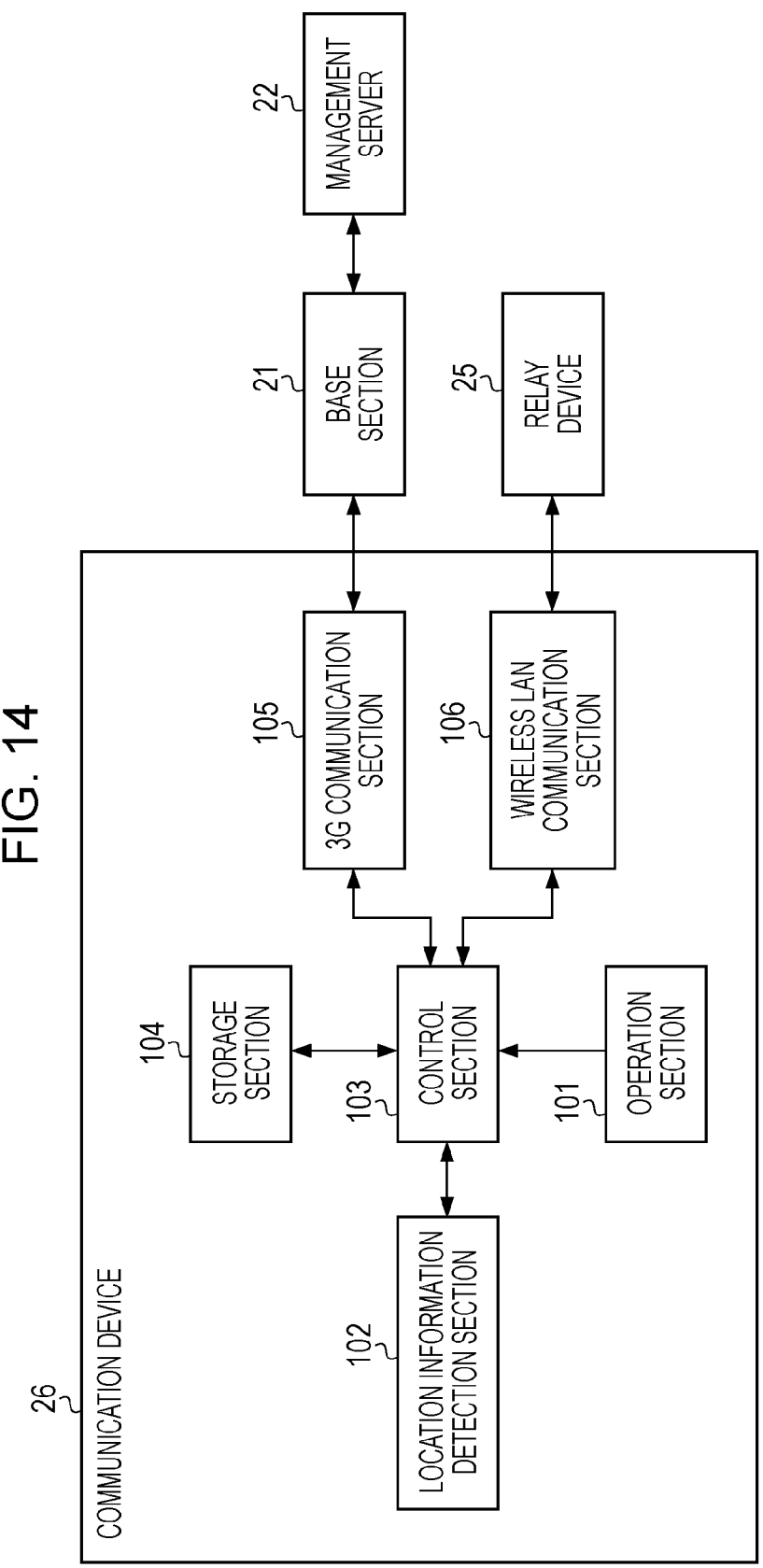
FIG. 14 is a block diagram illustrating a configuration example of a communication device.

FIG. 14 illustrates a configuration example of the communication device 26.

The communication device 26 is configured of an operation section 101, a location information detection section 102, a control section 103, a storage section 104, a 3G communication section 105 and a wireless LAN communication section 106.

The operation section 101 is configured of for example, an operation button or the like, and is operated by the user of the communication device 26. The operation section 101 supplies the corresponding operation signal to the control section 103 corresponding to the operation by the user.

The location information showing the present location of the communication device 26 is detected using the location information detection section 102, the GPS or the like and is supplied to the control section 103. In addition, in the 3G communication section 105, the location information of the base station is received from a nearby base station and the received location information may be supplied to the control section 103 as the location information of the communication device 26. In this case, in the communication device 26, the location information detection section 102 is not demanded to provide.

The control section 103 performs for example, control of the location information detection section 102, the 3G communication section 105 and the wireless LAN communication section 106 based on the operation signal from the operation section 101.

In addition, for example, the control section 103 reads the device ID of the communication device 26 from the storage section 104. Thus, the control section 103 generates the communication packet including the read device ID and the location information from the location information detection section 102 and supplies it to the 3G communication section 105.

The control section 103 generates again the communication packet based on the message prompting reconnection from the 3G communication section 105 through Wi-Fi communication and supplies it the 3G communication section 105.

Furthermore, for example, the control section 103 generates the surrounding AP list 41 showing the list of the relay device 25 that is present around the communication device 26 based on the beacon received from the relay device 25 via the wireless LAN communication section 106.

Thus, the control section 103 generates the connection destination AP list 43 based on the generated surrounding AP list 41 and the priority AP list 42 from the 3G communication section 105. The control section 103 attempts connection to the relay device 25 in the priority order described in the connection destination AP list 43 based on the generated connection destination AP list 43.

The control section 103 generates the connection start information corresponding to the start of the Wi-Fi communication with the relay device 25 by the control of the wireless LAN communication section 106, and supplies it to the 3G communication section 105. In addition, the control section 103 generates the connection finish information corresponding to the finish of the Wi-Fi communication with the relay device 25 by control of the wireless LAN communication section 106, and supplies it to the 3G communication section 105.

The storage section 104 holds beforehand other device ID of the communication device 26 such as the program performed by the control section 103.

The 3G communication section 105 transmits the communication packet from the control section 103 to the management server 22 via the base station 21. In addition, for example, the 3G communication section 105 receives the priority AP list 42 received from the management server 22 via the base station 21 corresponding to receiving the communication packet and supplies it to the control section 103.

Furthermore, for example, the 3G communication section 105 receives the message prompting reconnection through Wi-Fi communication, which is transmitted from the management server 22 via the base station and supplies it to the control section 103.

In addition, for example, the 3G communication section 105 supplies the connection start information and the connection finish information from the control section 103 to the management server 22 via the base station 21.

The wireless LAN communication section 106 attempts the connection with the predetermined relay device 25 according to the control from the control section 103. Thus, the wireless LAN communication section 106 communicates the communication data through Wi-Fi communication with the relay device 25 of the connection destination corresponding to the connection to the predetermined relay device 25.

Operation Description of Communication Device 26

Figure 15:
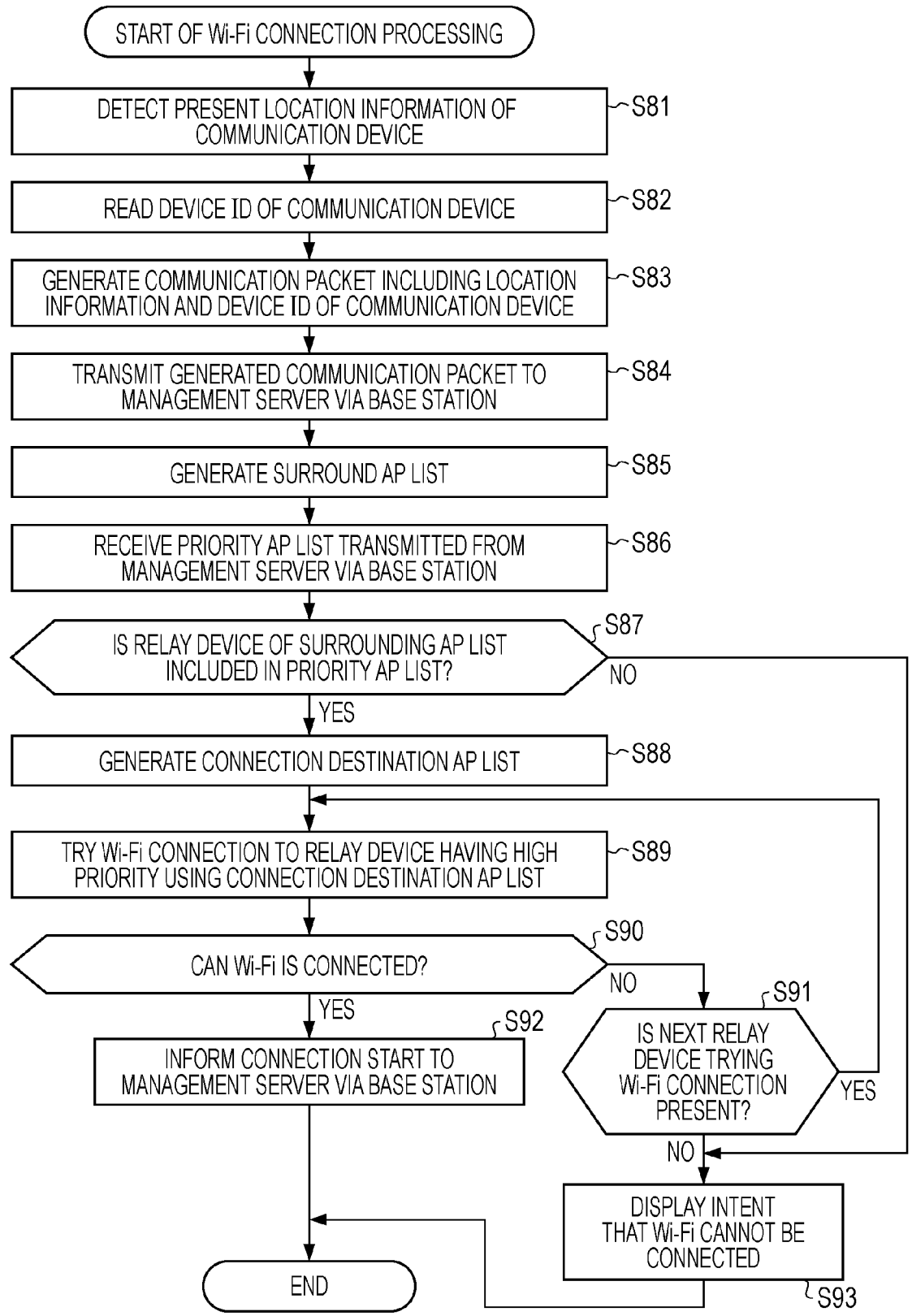
FIG. 15 is a flowchart which explains a Wi-Fi connection processing performed by a communication device.

The Wi-Fi connection processing performed by the communication device 26 will be described with reference to the flowchart of FIG. 15.

In addition, the Wi-Fi connection processing, for example, is started when the operation section 101 of the communication device 26 is operated so that the user makes the Wi-Fi communication started with the relay device 25. At this time, the control section 103 performs control of the location information detection section 102, the 3G communication section 105 and the wireless LAN communication section 106 based on the operation signal from the operation section 101, and the Wi-Fi communication with the relay device 25 is started.

Furthermore, for example, the Wi-Fi connection processing is started when the message from the management server 22 via the base station 21 prompting reconnection through Wi-Fi communication through Wi-Fi communication in the 3G communication section 105.

In step S81, the location information detection section 102 detects the location information showing the present location of the communication device 26 using the GPS or the like and supplies it to the control section 103.

In step S82, the control section 103 reads the device ID of the communication device 26 from the storage section 104. Thus, in step S83, the control section 103 generates the communication packet including the location information and the read device ID from the location information detection section 102, and supplies it to the 3G communication section 105.

In step S84, the 3G communication section 105 transmits the communication packet from the control section 103 to the management server 22 via the base station 21.

In step S85, the control section 103 generates the surrounding AP list 41 showing the list of the relay device 25 that may communicate with the communication device 26 through Wi-Fi communication based on the beacon received from the relay device 25 through the wireless LAN communication section 106, supplies and then stores it in the storage section 104.

In addition, the management server 22 transmits the priority AP list 42 to the 3G communication section 105 via the base station 21, wherein the priority AP list 42 shows relay device candidates 25 to be communicated through Wi-Fi communication in priority with the communication device 26 according to receiving the communication packet transmitted from the 3G communication section 105 via the base station 21.

In step S86, the 3G communication section 105 receives the priority AP list 42 transmitted from the management server 22 via the base station 21 and supplies it to the control section 103.

In step S87, the control section 103 decides whether or not the relay device 25 described in the surrounding AP list 41 that is stored in the storage section 104 is included in the priority AP list 42 from the 3G communication section 105.

In step S87, in a case where the control section 103 decides that the relay device 25 described in the surrounding AP list 41 that is stored in the storage section 104 is included in the priority AP list 42 from the 3G communication section 105, the process advances to step S88.

In step S88, the control section 103 generates the priority AP list 42 from the 3G communication section 105, and the connection destination AP list 43 showing the list of the relay device 25 that is described common in the surrounding AP list 41 that is stored in the storage section 104.

In step S89, the control section 103 pays attention to the relay device 25 that is the highest in the priority order of a plurality of the relay devices 25 described in the generated connection destination AP list 43. Thus, the control section 103 performs control of the wireless LAN communication section 106 and attempts connection to the relay device 25 through Wi-Fi communication.

In addition, the control section 103 also transmits the one-time password used in authentication to the relay device 25 described in the priority AP list 42, besides the priority AP list 42 from the management server 22 via the base station 21 and the 3G communication section 105.

The control section 103 performs the authentication of the relay device 25 to which attention is paid using the transmitted one-time password so that the connection is tried through Wi-Fi communication.

In step S90, the control section 103 performs control of the wireless LAN communication section 106 and then decides whether or not the wireless LAN communication section 106 may be connected to the relay device 25 to which attention is paid within a predetermined time, and in a case where the decision is that the connection is performed in a predetermined time, the process advances to step S91.

In step S91, the control section 103 decides whether or not the relay device 25 to which attention is not yet paid is present, in a plurality of the relay devices 25 described in the generated connection destination AP list 43 based on the connection destination AP list 43. In a case where the control section 103 decides that the relay device 25 to which attention is not yet paid is present, the process returning to step S89.

Thus, in step S89, the control section 103 pays attention to the relay device 25 that is described in the generated connection destination AP list 43 and has the highest priority order of the relay devices 25 to which attention is not yet paid. Thus, the control section 103 performs control of the wireless LAN communication section 106 and attempts the connection to the relay device 25 to which attention is paid through Wi-Fi communication, and then the process advances to step S90. Subsequently, similar process is performed.

In step S90, the control section 103 performs control of the wireless LAN communication section 106 and in a case where the decision is that the wireless LAN communication section 106 is connected to the relay device 25 to which attention is paid within a predetermined time, the process advances to step S92.

In step S92, the control section 103 generates the connection start information showing the intent to start the connection to the relay device 25 to which attention is paid and supplies it to the 3G communication section 105.

Thus, the 3G communication section 105 transmits the connection start information from the control section 103 to the management server 22 via the base station 21.

In addition, in step S87, in a case where the decision is that the relay device 25 described in the surrounding AP list 41 is not included in the priority AP list 42, and in step S91, in a case where the decision is that the relay device 25 to which attention is not yet paid described in the surrounding AP list 41 is not present in the priority AP list 42, the process advances to step S93.

In step S93, the control section 103 supplies a connection failure notification showing the intent that the connection to any of the relay devices 25 may not be performed with the 3G communication section 105.

Thus, the control section 103 performs control of the 3G communication section 105 and then transmits the connection failure notification to the management server 22 via the base station 21. The mentioned above, the Wi-Fi connection processing is finished.

As described above, according to the Wi-Fi connection processing, the connection destination AP list 43 is generated based on the priority AP list 42 and the surrounding AP list 41, and the generated connection destination AP list 43 is used so that the relay device 25 to be communicated through Wi-Fi communication is determined. Accordingly, for example, a more suitable relay device 25 may be determined compared to a case where the relay device 25 to be communicated through Wi-Fi communication is determined using for example, only the priority AP list 42.

Next, FIG. 16 illustrates an advantage in which the connection destination AP list 43 is generated based on the priority AP list 42 and the surrounding AP list 41.

Figures 16A, 16B:
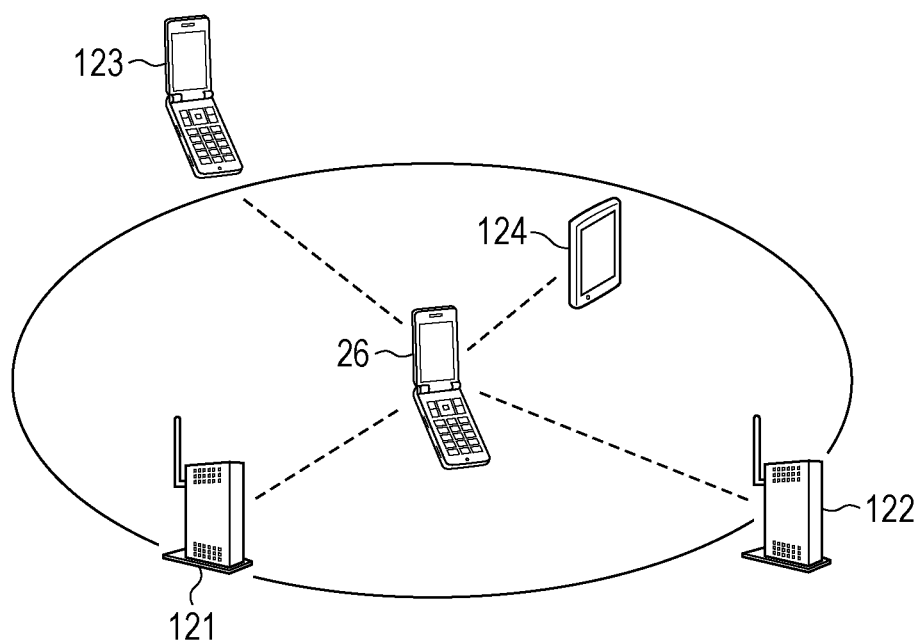
FIG. 16 is a view illustrating an advantage of a case where a connection destination is determined using a priority AP list and a surrounding AP list.

FIG. 16A illustrates an example of the device IDs described in the priority AP list 42 and the surrounding AP list 41 respectively. In addition, the device IDs "AP121", "AP122", "AP123" and "AP124" show the device IDs of the relay devices 121, 122, 123 and 124 respectively.

In addition, as shown in FIG. 16B, the relay devices 121 to 124 are present around the communication device 26.

In FIG. 16A, the device ID "AP123" of the relay device 123 and the device ID "AP124" of the relay device 124 are described in the priority AP list 42. In addition, since the relay devices 121 and 122 do not have a function that transmits the relay information to the management server 22, the device IDs "AP123" and "AP124" are not described in the priority AP list 42.

In addition, in FIG. 16B, the device ID "AP121" of the relay device 121, the device ID "AP122" of the relay device 122 and the device ID "AP124" of the relay device 124 are described in the surrounding AP list 41. In addition, in the communication device 26, since the beacon above the predetermined signal level may not be received from the relay device 123, the device ID "AP123" is not described in the surrounding AP list 41.

In a case where the communication device 26 selects the relay device performing the Wi-Fi communication using only the priority AP list 42, one of the relay device 123 or the relay device 124 is selected as the connection destination, and the relay device 123 that has relatively poor communication situation may be selected.

However, the surrounding AP list 41 is also used in addition to the priority AP list 42, so that the relay device 123 that has a poor communication situation is not selected but the relay device 124 that has a relatively good communication situation is selected and then the communication device 26 may communicate through Wi-Fi communication.

2. Modified Example

In the embodiment, the management server 22 manages the communication situation or the like of the relay device 25 as portable handsets using the management table shown in FIG. 2.

Furthermore, for example, the management server 22 manages the communication situation or the like of the wireless LAN access point 24. In addition, in this case, the wireless LAN access point 24 generates the suitable relay information and supplies it to the management server 22 through the base station 21. Here, in FIG. 1, in order to avoid complication of the drawing, only one wireless LAN access point 24 is illustrated, however, a plurality of the wireless LAN access points 24 may be present. Accordingly, the management server 22 manages the communication situation or the like of one or a plurality of the wireless LAN access points.

When configuring as described above, the management server 22 generates for example, the priority AP list 42 having the high priority as fixed wireless LAN access point and may supply the priority AP list 42 to the communication device 26 via the base station 21.

Since the relay device 25 may be moved, and the wireless LAN access point 24 is fixed and does not move, it is desirable that the Wi-Fi communication be performed with the wireless LAN access point 24.

In addition, in the embodiment, when connection to the relay device 25 is performed through Wi-Fi communication, the one-time password is used in the communication device 26. However, connection of the Wi-Fi communication may be performed by mutually exchanging device passwords using a near field communication (NFC) by electromagnetic induction between the communication device 26 and the relay device 25.

Furthermore, for example, in the communication device 26, a connection start button for starting the connection through Wi-Fi communication at the communication device 26 and the relay device 25 so that connection of the Wi-Fi communication may be started according to pressing of the connection start button of both the communication device 26 and the relay device 25.

For example, in the embodiment, the management server 22 is to be connected to the base station 21 forming the mobile phone network, furthermore, for example, may be connected to the base station 21 via network 23.

In addition, the technology may be configured as below.

(1) A management device including: a management table generation section that generates a management table in which location information showing the present location of a relay device is held in each relay device that relays the connection to a first network, a first receiving section that receives a location information showing the present location of a communication device from the communication device via a second network different from the first network, the communication device being connected to the first network via a relay device, a list generation section that generates a candidate list showing relay device candidates that relay a connection to the first network by communicating with the communication device with reference to the management table based on the location information of the communication device, and a transmission section that transmits the candidate list to the communication device via a second network.

(2) The management device according to (1), further including a request section that requests the location information of the communication device to the communication device via a second network according to a change in communication situation of the relay device communicating with the communication device, wherein the list generation section newly generates the candidate list with reference to the management table based on the location information of the communication device that is received according to the request from the receiving section.

(3) The management device according to (1) or (2), wherein the management table generation section generates the management table in which the communication information indicating the communication situation of the relay device in addition to the location information is held in each relay device, wherein the list generation section generates the candidate list in which a priority order is associated with the relay device candidates that relay a connection to the first network by communicating with the communication device, based on the communication information.

(4) The management device according to (2), wherein the request section requests the location information of the communication device to the communication device via a second network in response to one of wave strength or communication speed of the relay device communicating with the communication device is less than a predetermined threshold.

(5) The management device according to (3), further including a second receiving section that receives the location information and the communication information from the relay device via the second network, wherein the management table generation section generates the management table based on the received location information and the communication information.

(6) A management method of a management device managing a relay device that relays the connection to a first network, the management method including: according to the management device, generating a management table in which location information showing the present location of the relay device is held in each relay device that relays the connection to the first network, receiving a location information showing the present location of a communication device from the communication device via a second network different from the first network, the communication device being connected to the first network via a relay device, communicating with the communication device with reference to the management table based on the location information of the communication device and generates a candidate list showing relay device candidates that relay a connection to the first network, and transmitting the candidate list to the communication device via a second network.

(7) A program enabling a computer to function as, a management table generation section that generates a management table in which location information showing the present location of a relay device is held in each relay device that relays the connection to a first network, a first receiving control section that receives a location information showing the present location of a communication device from the communication device via a second network different from the first network, the communication device being connected to the first network via a relay device, a list generation section that generates a candidate list showing relay device candidates that relay a connection to the first network by communicating with the communication device with reference to the management table based on the location information of the communication device, and a transmission control section that transmits the candidate list to the communication device via a second network.

(8) A communication device including: a communication section that connects to and communicates with a first network, a receiving section that communicates with the communication section and receives a candidate list showing candidates of relay devices that relay a connection to the first network via a second network different from the first network, a list generation section that generates a communicable list showing the relay device that may communicate with the communication section, a connection destination list generation section that generates a connection destination list showing the relay device that may communicate with the communication section of the relay device candidates based on the candidate list and the communicable list, and a determination section that determines the relay device communicated with the communication section based on the connection destination list.

(9) The communication device according to (8), wherein the receiving section receives the candidate list showing the relay device candidates in which a priority order for communicating with the communication section is associated, and wherein the connection destination list generation section generates the connection destination list showing the relay device in which the priority order is associated based on the candidate list and the communicable list.

(10) The communication device according to (8) or (9), further including an acquisition section that acquires the location information showing the present location, and a request section that transmits a request signal including the location information and requesting the candidate list via a second network, wherein the receiving section receives the candidate list that is transmitted via a second network according to the transmission of the request signal.

(11) The communication device according to (10), wherein the request section further transmits the request signal including the location information via a second network in response to the location information of the communication device is requested by change in the communication situation of the relay device communicating with the communication section.

(12) A communication method of a communication device having a communication section that connects to and communicates with a first network, the communication method including: according to the communication device, communicating with the communication section and receives a candidate list showing candidates of relay devices that relay a connection to the first network via a second network different from the first network, generating a communicable list showing the relay device that may communicate with the communication section, generating a connection destination list showing the relay device that may communicate with the communication section of the relay device candidates based on the candidate list and the communicable list, and determining the relay device communicated with the communication section based on the connection destination list.

(13) A program enabling a computer of a communication device having a communication section that connects to and communicates with a first network to function as, a receiving control section that communicates with the communication section and receives a candidate list showing candidates of relay devices that relay a connection to the first network via a second network different from the first network, a list generation section that generates a communicable list showing the relay device that may communicate with the communication section, a connection destination list generation section that generates a connection destination list showing the relay device that may communicate with the communication section of the relay device candidates based on the candidate list and the communicable list, and a determination section that determines the relay device communicated with the communication section based on the connection destination list.

(14) A relay device including: a relay section that relays the connection to a first network, an acquisition section that acquires location information showing the present location, a transmission section that transmits relay information including at least the location information to management device managing the relay device via a second network different from the first network, and a setting section that sets operation of the relay section according to operation of a user.

(15) The relay device according to (14), the setting section sets at least one of relay time in which relaying is possible by the relay section, relay availability, maximum possible relay time, possible relay time band, communication band that is used when relaying, protocol that is used when relaying, or communication device that limits the relay according to operation by the user.

(16) The relay device according to (14) or (15), further including a collection section that collects the communication information showing the communication situation by the relay section, wherein the transmission section transmits the relay information also including the communication information to the management device via a second network.

(17) A relay method of a relay device having relay section that relays the connection to a first network, the method including: acquiring location information showing the present location, transmitting relay information including at least the location information to management device managing the relay device via a second network different from the first network, and setting operation of the relay section according to operation of a user.

(18) A program enabling a computer of a relay device having a relay section that relays the connection to a first network to function as, an acquisition section that acquires location information showing the present location, a transmission section that transmits relay information including at least the location information to management device managing the relay device via a second network different from the first network, and a setting section that sets operation of the relay section according to operation of a user.

(19) A communication system including: a communication device that connects to and communicates with a first network, a relay device that relays the connection of the communication device to the first network and a management device that manages the relay device, the management device having: a generation section that generates a management table in which location information showing the present location of a relay device is held in each relay device that relays the connection to a first network, a first receiving section that receives a location information showing the present location of a communication device from the communication device via a second network different from the first network, the communication device being connected to the first network via a relay device, a first list generation section that generates a candidate list showing relay device candidates that relay a connection to the first network by communicating with the communication device with reference to the management table, based on the location information of the communication device and, and a first transmission section that transmits the candidate list to the communication device via a second network, the communication device having: a communication section that connects to and communicates with the first network, a second receiving section that receives the candidate list from the first transmission section via a second network, a second list generation section that generates a communicable list showing the relay device that may communicate with the communication section, a connection destination list generation section that generates a connection destination list showing the relay device that may communicate with the communication section of the relay device candidates based on the candidate list and the communicable list, and a determination section that determines the relay device communicated with the communication section based on the connection destination list, and the relay device having: a relay section that relays the connection to the first network, an acquisition section that acquires the location information showing the present location, a second transmission section that transmits the relay information including at least the location information to the management device via a second network, and a setting section that sets operation of the relay section according to operation of the user.

Meanwhile, a series of the processing as described above may also be performed by the hardware and be performed by the software. In a case where a series of the processing is performed by the software, the program that configures the software is installed from the program recording medium to a computer mounted in a dedicate hardware or a general computer in which various functions can be performed by installing various programs.

Configuration Example of Computer

FIG. 17 illustrates hardware of a computer that performs the above described a series of processes by a program.

A CPU (Central Processing Unit) 141 performs various processing according to the program stored in a ROM (Read Only Memory) 142 or the storage section 148. A RAM (Random Access Memory) 143 suitably stores the program, data or the like that is performed by the CPU 141. The CPU 141, the ROM 142, and the RAM 143 are connected mutually by a bus 144.

The CPU 141 connects to an input/output interface 145 via the bus 144. The input/output interface 145 connects to an input section 146 including a keyboard, a mouse, microphone, or the like, and an output section 147 including a display, a speaker or the like. The CPU 141 performs various processes corresponding to command that is input from the input section 146. Thus, the CPU 141 outputs a result of process to the output section 147.

A storage section 148 connected to the input/output interface 145 is formed for example, by a hard disk and stores various data or programs that are performed by the CPU 141. The communication section 149 communicates with external devices via a network or a network such as a Local Area Network.

In addition, the program may be acquired via the communication section 149 and may be stored in the storage section 148.

When removable media 151 such as an electromagnetic disc, an optical disc a magneto-optical disc or a semiconductor memory are mounted, a drive 150 connected to the input/output interface 145 drives them and acquires programs or data recorded in them. The acquired programs or data are transmitted and stored in the storage section 148 if demanded.

As shown in FIG. 17, the recording media that is installed in the computer and records (stores) the programs in a performable state by the computer is configured of an electromagnetic disc (including a flexible disk), an optical disc (including a CD-ROM (a Compact Disc-Read Only Memory), a DVD (a Digital Versatile Disclosure), the magneto-optical disc (including a MD (Mini-Disc)), the removable media 151 that is a package media formed by the semiconductor memory or the like, the ROM 142 in which the program is accommodated temporarily or permanently, the hard disk configuring the storage section 148, or the like. The recording of the program to the recording media is performed using wired or wireless communication media such as the Local Area Network, the network, and digital satellite broadcasting via the communication section 149 that is the interface such as a router, a modem or the like if demanded.

In addition, in the specification, a step describing the above-described series of processes also includes a process in parallel or individually even though it is not processed basically in time series as well as a process performed in time-series along described order.

In the specification, the system shows an overall device configured of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. A management device comprising:
a management table generation section that generates a management table that stores location information showing a present location of each relay device that relays a connection to a first network,
a first receiving section that receives a location information showing a present location of a communication device from the communication device via a second network different from the first network, the communication device being connected to the first network via a relay device, a list generation section that with reference to the management table, based on the location information of the communication device, generates a candidate list showing relay device candidates that relay a connection to the first network by communicating with the communication device, a transmission section that transmits the candidate list to the communication device via the second network, and a request section that requests the location information of the communication device to the communication device via the second network according to a change in communication situation of the relay device communicating with the communication device, wherein the list generation section newly generates the candidate list with reference to the management table based on the location information of the communication device that is received according to the request from the request section.

2. The management device according to claim 1, wherein the management table generation section generates the management table that stores communication information indicating the communication situation of the relay device in addition to the location information, wherein the list generation section generates the candidate list in which a priority order is associated with the relay device candidates that relay a connection to the first network by communicating with the communication device, based on the communication information.

3. The management device according to claim 2, further comprising a second receiving section that receives the location information of the relay device and the communication information from the relay device via the second network, wherein the management table generation section generates the management table based on the received location information of the relay device and the communication information.

4. The management device according to claim 1, wherein the request section requests the location information of the communication device to the communication device via the second network in response to one of wave strength or communication speed of the relay device communicating with the communication device is less than a predetermined threshold.

5. A management method of a management device managing a relay device that relays a connection to a first network, the management method comprising:

in the management device,
generating a management table that stores location information showing present location of each relay device that relays a connection to the first network, receiving a location information showing a present location of a communication device from the communication device via a second network different from the first network, the communication device being connected to the first network via the relay device, generating a candidate list showing relay device candidates that relay a connection to the first network by communicating with the communication device with reference to the management table based on the location information of the communication device, transmitting the candidate list to the communication device via the second network, requesting the location information of the communication device to the communication device via the second network according to a change in communication situation of the relay device communicating with the communication device, and generating the candidate list newly with reference to the management table based on the location information of the communication device that is received according to the request from a request section.

6. A communication device comprising:
a communication section that connects to and communicates with a first network, a receiving section that receives a candidate list showing candidates of relay devices that relay a connection to the first network by communicating with the communication section via a second network different from the first network, a list generation section that generates a communicable list showing the relay device that can communicate with the communication section, a connection destination list generation section that generates a connection destination list showing the relay device that can communicate with the communication section of the relay device candidates based on the candidate list and the communicable list, and a determination section that determines the relay device communicated with the communication section based on the connection destination list.

7. The communication device according to claim 6,
wherein the receiving section receives the candidate list showing the relay device candidates in which a priority order for communicating with the communication section is associated, and wherein the connection destination list generation section generates the connection destination list showing the relay device in which the priority order is associated based on the candidate list and the communicable list.

8. The communication device according to claim 6, further comprising an acquisition section that acquires the location information showing the present location, and a request section that transmits a request signal including the location information and requesting the candidate list via a second network, wherein the receiving section receives the candidate list that is transmitted via a second network according to the transmission of the request signal.

9. The communication device according to claim 8, wherein the request section further transmits the request signal including the location information via a second network in response to the request of the location information of the communication device by change in the communication situation of the relay device communicating with the communication section.

10. A communication method of a communication device having a communication section that connects to and communicates with a first network, the communication method comprising:

according to the communication device,
receiving a candidate list showing candidates of relay devices that relay a connection to the first network by communicating with the communication section via a second network different from the first network, generating a communicable list showing the relay device that can communicate with the communication section, generating a connection destination list showing the relay device that can communicate with the communication section of the relay device candidates based on the candidate list and the communicable list, and determining the relay device communicated with the communication section based on the connection destination list.

11. A relay device comprising:
a relay section that relays a connection to a first network,
an acquisition section that acquires location information showing a present location,
a transmission section that transmits relay information including at least the location information to a management device managing the relay device via a second network different from the first network, and
a setting section that:
   sets operation of the relay section according to operation of a user, and
   sets at least one of relay time in which relaying is possible by the relay section, relay availability, maximum possible relay time, possible relay time band, communication band that is used when relaying, protocol that is used when relaying, or a communication device that limits the relay according to the operation by the user.

12. The relay device according to claim 11, further comprising
a collection section that collects communication information showing communication situation by the relay section,
wherein the transmission section transmits the relay information including the communication information to the management device via the second network.

13. A relay method of a relay device having relay section that relays a connection to a first network, the relay method comprising:
   acquiring location information showing a present location,
   transmitting relay information including at least the location information to a management device managing the relay device via a second network different from the first network,
   setting operation of the relay section according to operation of a user, and
   setting at least one of relay time in which relaying is possible by the relay section, relay availability, maximum possible relay time, possible relay time band, communication band that is used when relaying, protocol that is used when relaying, or a communication device that limits the relay according to the operation by the user.

* * * * *